United States Patent
Bisht et al.

(10) Patent No.: US 10,651,851 B2
(45) Date of Patent: May 12, 2020

(54) INTEGRATED CIRCUIT LAYOUT WIRING FOR MULTI-CORE CHIPS

(71) Applicant: STMicroelectronics, Inc., Coppell, TX (US)

(72) Inventors: Chetan Bisht, Duluth, GA (US); Harry Scrivener, III, Lawrenceville, GA (US)

(73) Assignee: STMicroelectronics, Inc., Coppell, TX (US)

( * ) Notice: Subject to any disclaimer, the term of this patent is extended or adjusted under 35 U.S.C. 154(b) by 0 days.

(21) Appl. No.: 16/142,627

(22) Filed: Sep. 26, 2018

(65) Prior Publication Data
US 2019/0068193 A1 Feb. 28, 2019

Related U.S. Application Data

(63) Continuation of application No. 14/985,887, filed on Dec. 31, 2015, now Pat. No. 10,097,182, which is a
(Continued)

(51) Int. Cl.
*H03K 19/0175* (2006.01)
*H01L 23/528* (2006.01)
(Continued)

(52) U.S. Cl.
CPC . *H03K 19/017509* (2013.01); *G06F 17/5072* (2013.01); *G06F 17/5077* (2013.01);
(Continued)

(58) Field of Classification Search
CPC ............ G06F 17/5077; G06F 17/5072; G06F 12/0806; G06F 2217/68; G06F 30/392;
(Continued)

(56) References Cited

U.S. PATENT DOCUMENTS

| | | |
|---|---|---|
| 5,146,428 A | 9/1992 | Tanimura |
| 5,304,826 A | 4/1994 | Ichikawa et al. |

(Continued)

FOREIGN PATENT DOCUMENTS

EP  1 538 540 A2  6/2005

OTHER PUBLICATIONS

Dhami et al., "Using SOC Olympus for Area Advantage on Channel-Less Design," User2User Presentation, Dec. 6, 2013, 21 pages.
(Continued)

*Primary Examiner* — Helen Rossoshek
(74) *Attorney, Agent, or Firm* — Seed IP Law Group LLP

(57) ABSTRACT

An integrated circuit system-on-chip (SOC) includes a semiconductor substrate, a plurality of components made up of transistors formed in the substrate, and a plurality of interconnection lines providing electrical connectivity among the components. Use of a channel-less design eliminates interconnection channels on the top surface of the chip. Instead, interconnection lines are abutted to one another in a top layer of metallization, thus preserving 5-10% of chip real estate. Clock buffers that are typically positioned along interconnection channels between components are instead located within regions of the substrate that contain the components. Design rules for channel-less integrated circuits permit feed-through interconnections and exclude multi-fanout interconnections.

16 Claims, 15 Drawing Sheets

Related U.S. Application Data continuation-in-part of application No. 14/871,584, filed on Sep. 30, 2015, now Pat. No. 10,102,327.

(60) Provisional application No. 62/099,094, filed on Dec. 31, 2014.

(51) Int. Cl.
*H01L 23/50* (2006.01)
*G06F 17/50* (2006.01)

(52) U.S. Cl.
CPC .......... *H01L 23/50* (2013.01); *H01L 23/5286* (2013.01); *H01L 2924/0002* (2013.01)

(58) Field of Classification Search
CPC .......... G06F 30/394; H03K 19/017509; H01L 23/50; H01L 23/5286; H01L 2924/0002; H01L 29/78696
See application file for complete search history.

(56) References Cited

U.S. PATENT DOCUMENTS

| | | | |
|---|---|---|---|
| 5,497,108 A | 3/1996 | Menon et al. | |
| 6,282,147 B1 | 8/2001 | Fujima | |
| 6,405,345 B1 | 6/2002 | Ginetti | |
| 6,467,074 B1 | 10/2002 | Katsioulas et al. | |
| 6,567,967 B2 | 5/2003 | Greidinger et al. | |
| 6,925,627 B1 | 8/2005 | Longway et al. | |
| 7,137,092 B2 * | 11/2006 | Maeda | G06F 17/5068 716/53 |
| 7,487,488 B1 | 2/2009 | Huang et al. | |
| 7,590,962 B2 * | 9/2009 | Frenkil | G06F 17/5031 326/33 |
| 7,603,644 B2 | 10/2009 | Waller | |
| 7,700,410 B2 | 4/2010 | Bernstein et al. | |
| 7,721,244 B2 | 5/2010 | Ono | |
| 8,080,442 B2 | 12/2011 | Leedy | |
| 8,407,650 B1 | 3/2013 | Avidan et al. | |
| 8,456,856 B2 | 6/2013 | Lin et al. | |
| 8,918,689 B2 | 12/2014 | Kulkarni et al. | |
| 8,975,725 B2 | 3/2015 | Hamada et al. | |
| 9,070,732 B2 | 6/2015 | Zampardi, Jr. et al. | |
| 9,495,309 B2 | 11/2016 | Sauber | |
| 9,632,140 B2 | 4/2017 | Kulkarni et al. | |
| 9,660,584 B2 | 5/2017 | Modi et al. | |
| 9,680,765 B2 | 6/2017 | Kaul et al. | |
| 2002/0087939 A1 | 7/2002 | Greidinger et al. | |
| 2002/0097068 A1 | 7/2002 | Morgan | |
| 2004/0232982 A1 | 11/2004 | Ichitsubo et al. | |
| 2005/0052894 A1 * | 3/2005 | Segal | B82Y 10/00 365/129 |
| 2005/0116738 A1 | 6/2005 | Auracher et al. | |
| 2006/0055065 A1 | 3/2006 | Liu et al. | |
| 2010/0231263 A1 | 9/2010 | Fish et al. | |
| 2010/0306440 A1 | 12/2010 | Sauber | |
| 2012/0272112 A1 | 10/2012 | Oh et al. | |
| 2013/0341704 A1 | 12/2013 | Rachmady et al. | |
| 2016/0104517 A1 | 4/2016 | Park et al. | |
| 2016/0188777 A1 | 6/2016 | Bisht et al. | |
| 2016/0191058 A1 | 6/2016 | Bisht et al. | |
| 2017/0091365 A1 | 3/2017 | Gudala et al. | |
| 2017/0177534 A1 | 6/2017 | Mohseni et al. | |

OTHER PUBLICATIONS

Wu et al., "LILA: Layout Generation for Iterative Logic Arrays," *IEEE Transactions on Computer-Aided Design of Integrated Circuits and Systems* 14(11):1359-1369, 1995.

* cited by examiner

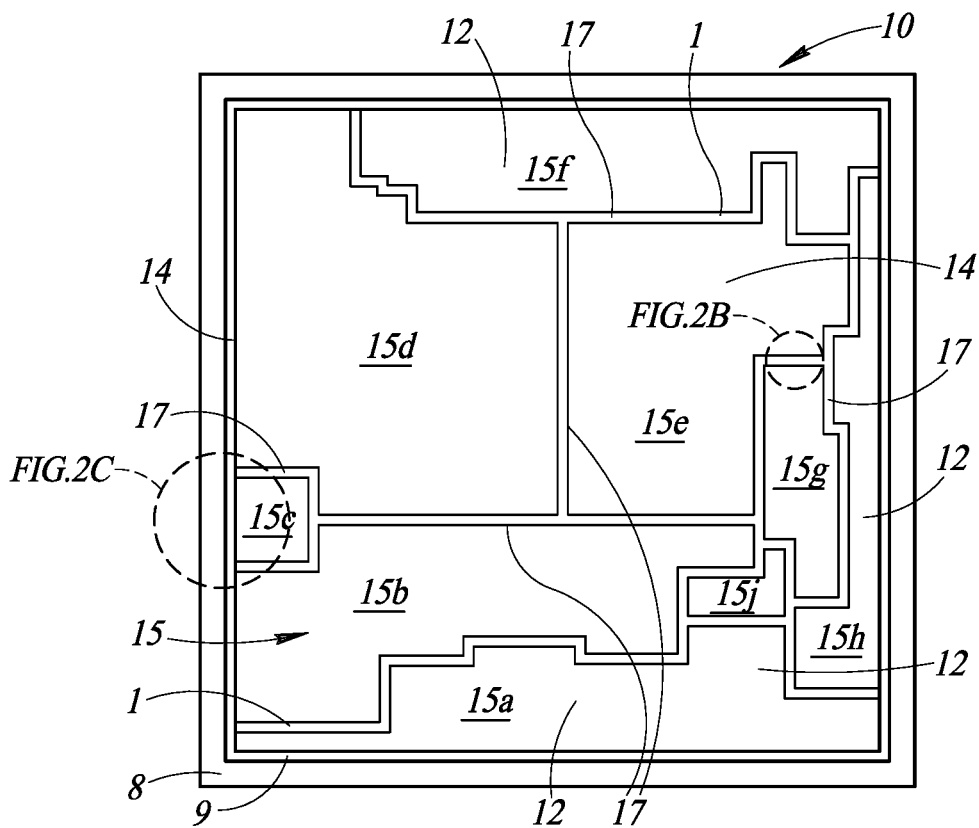
FIG.2A
(PRIOR ART)
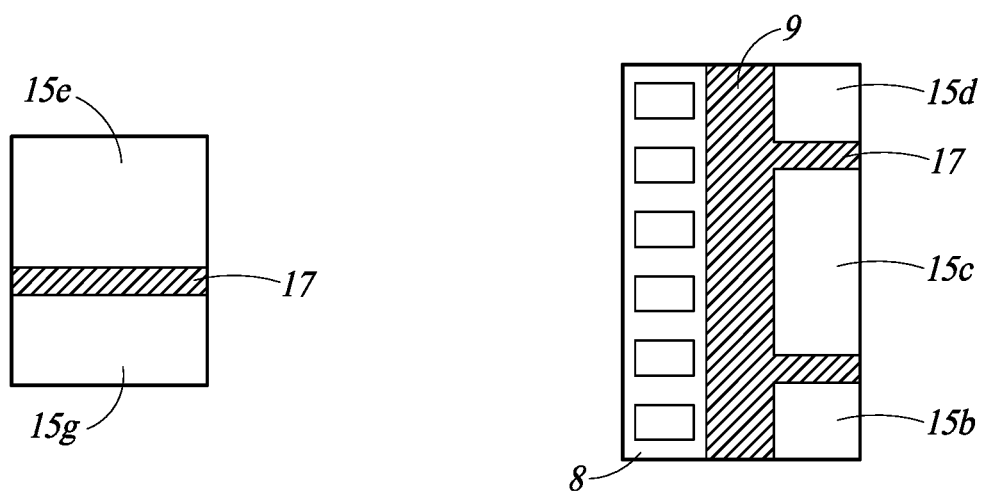
FIG.2B
(PRIOR ART)
FIG.2C
(PRIOR ART)

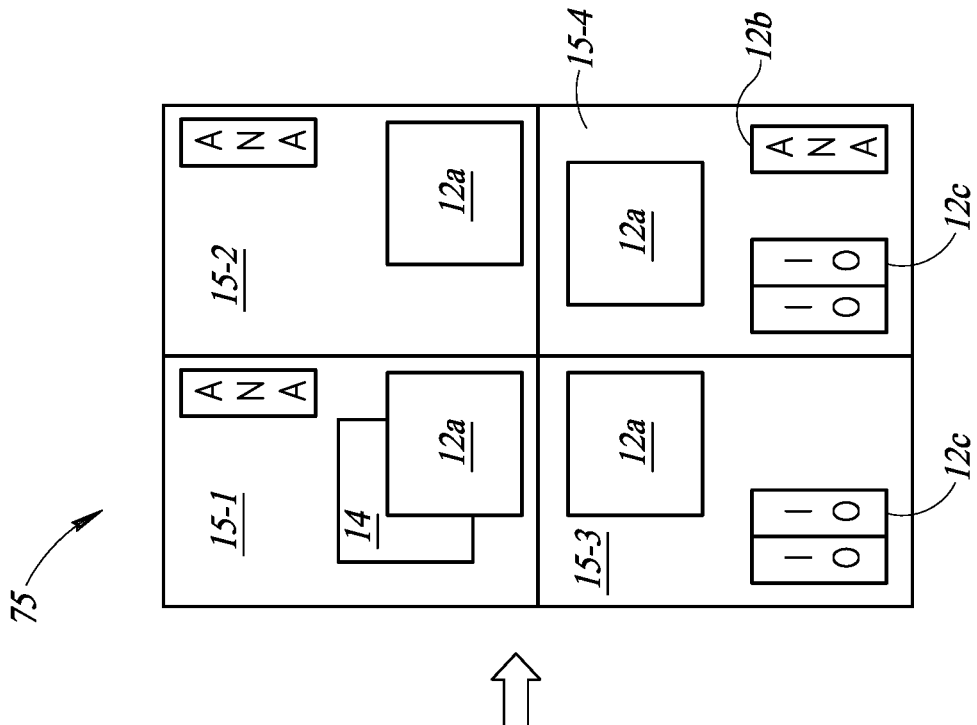
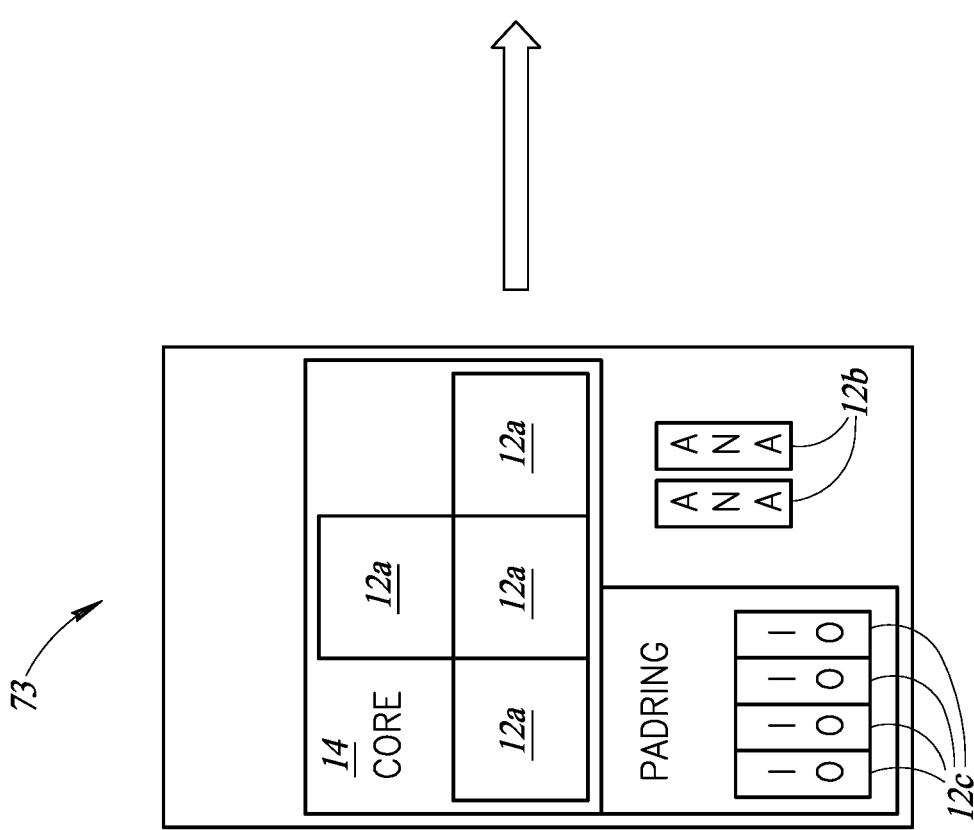
FIG.7B
FIG.7A
(PRIOR ART)

INTEGRATED CIRCUIT LAYOUT WIRING FOR MULTI-CORE CHIPS

CROSS-REFERENCE TO RELATED APPLICATIONS

This application is a continuation of U.S. application Ser. No. 14/985,887, filed on Dec. 31, 2015, which is a continuation-in-part of U.S. application Ser. No. 14/871,584, filed Sep. 30, 2015, which claims priority to U.S. Provisional Application No. 62/099,094 filed Dec. 31, 2014, all of which are incorporated in their entirety. U.S. application Ser. No. 14/985,887 also is a non-provisional of U.S. Provisional Application No. 62/099,094 filed Dec. 31, 2014.

BACKGROUND

Technical Field

This disclosure relates to the field of integrated circuit (IC) chip architecture and layout, and more particularly to the efficient routing of interconnect lines and bus lines.

Description of the Related Art

FIG. 1 is a block diagram of one example of a multi-core computer architecture in which numerous buses carry data between partitioned sections of a conventional integrated circuit die 10. In particular, the integrated circuit die 10 is a system-on-chip (SOC) that contains microelectronic components having transistors and interconnect wiring formed in and on a semiconductor substrate. The microelectronic components generally include one or more microprocessors 14 and a number of support components 12 that support operations of the microprocessors 14. The microprocessors 14 can include, for example, central processing units (CPUs), graphics processors, digital signal processors (DSPs), microcontrollers, and the like. The support components 12 can include any of the many types of operating units on the integrated circuit die 10, including memory, which may be RAM, ROM, EPROM, flash, cache, and the like. The support components 12 may also include memory exchange interfaces, shift registers, accelerator logic blocks, peripheral circuits, arithmetic logic units (ALUs), display drivers, power supplies, voltage regulators, clock circuits, timers, and any number of memory arrays or logic units that are required for the integrated circuit die 10 to operate properly. An SOC integrated circuit die may be used to build, for example, multimedia content receivers such as cable or satellite TV set top boxes; cable and internet modems; wireless routers; laptop computers; tablet computers; smartphones, or other electronic hardware items.

With the proliferation of multi-core chip architectures, the need for many wiring layers to interconnect all the different support components 12 and the microprocessors 14 to each other has greatly proliferated. Accordingly, a large number of buses 1, along with bus bridge circuits 18, are now used on the integrated circuit die 10 in order to properly connect all of the components to each other and ensure proper chip operation.

Interconnection lines, generally referred to as buses 1, provide connectivity between the various support components 12 and microprocessors 14. In addition, bus bridge circuits 18 link the buses to each other. Any component on the integrated circuit die 10 can be coupled to any other component for which it needs a connection for proper operation.

FIG. 2A illustrates an existing exemplary layout of the integrated circuit die 10, which is a system-on-chip (SOC) having a die size of about 100-120 mm$^2$. In FIG. 2A, structures similar to those shown in FIG. 1 are labeled with the same reference numbers. FIG. 2A clearly shows the interconnects of the integrated circuit die 10, which has a multi-core microprocessor architecture generally of the type as shown in FIG. 1. Specifically, the layout shown in FIG. 2A indicates locations of a number of microprocessors 14, support components 12, including memory units, a number of ALUs, DSPs, bus bridge circuits, and other support components 12, relative to the buses 1. The circuit designs for the various components are grouped together and organized into separate units, or design partitions 15, and arranged on the integrated circuit die 10 at convenient locations. The design partitions 15 may or may not be aligned with physical boundaries of the various microelectronic components. Specifically, the chip design shown in FIG. 2A includes a number of support components 12 as well as microprocessors 14 that can be considered as a group within each design partition 15.

In FIG. 2A, a number of buses 1 connect the various components with each other using channels 17. As detailed in the enlarged view in FIG. 2B, the channels 17 are regions of open space on a chip, located between design partitions 15 (15e, 15g) that are set aside specifically to accommodate the buses 1 to route signals and data between different components. The channels 17 are selected areas outside of any partition 15 reserved for electrical interconnections in the buses 1 that provide main communication arteries for wires connecting the different components. According to existing architectures a number of channels 17 are provided that are routed through various portions of the integrated circuit die 10, which can be seen in FIG. 2A as electrical wires running along the surface of the chip to connect the various components.

Conventional chip designs typically require that all of the interconnection lines and buses 1 between major partitions 15 and components 12 run in the channels 17 so that noise is suppressed and proper maintenance of clock signals is provided. Specifically, a number of amplifiers, repeat stations, and clock buffer circuits are provided in the silicon substrate under the channels 17 in order to maintain and provide consistent clock signals to the different components at the proper strength as they travel to different components in the integrated circuit die 10.

On an SOC die of size 100-120 mm$^2$, some of the channels 17 may be up to 100-150 µm wide to accommodate thousands of interconnecting wires, which would otherwise be usable chip real estate. The channels 17 may take up in the range of 5-8% of the surface area of the die, generally occupying, on average, approximately 6% of the chip area. In addition, the requirement to run interconnection lines and buses 1 within the channels 17 causes the lines to be significantly longer than would otherwise be needed if a direct connection were possible. This slows down chip operation, requires additional clock buffer circuits, and introduces delays. For example, clock delays and signal propagation delays may occur, which delays interfere with efficient chip operation and must be accommodated for by additional circuits.

The integrated circuit die 10 includes a ring of communication lines 9 around an edge of the die that are coupled to the transmission lines in the channels 17. Often signals from some of the internal partitions, like 15g, that need to communicate with the partition 15d will travel along the zig zag path of the channels 17 to the ring 9 to get to 15d. It is a long and convoluted path. These channels 17 do not pass over or through intervening partitions. For example, if partition 15*f* needs to talk to partition 15*a*, the channels do not pass through or over partitions 15*d*, 15*b*, or 15*e*, and instead travel around the edge of the die.

As can be seen in FIG. 2C, the ring 9 is a wide conduction line that is capable of transmitting large signals. The ring separates a pad region 8 from the partitions 15*b*, 15*c*, and 15*d*. The pad region 8 allows the die to be coupled to an external device, such as a printed circuit board or another die.

BRIEF SUMMARY

According to principles of the embodiments as discussed herein, interconnection lines in a system-on-chip run directly between partitions and are not required to be within pre-established channels. In a preferred embodiment, either no channels, or few channels around the periphery of the chip are used to connect the integrated circuit components to each other. Instead, buses and other interconnection lines are routed directly from one partition to another and utilizing transistors that are located within the partition to provide buffer circuits to reinforce the strength of the signals and data. This is accomplished by providing a small region having between a few dozen and a few hundred transistors which are set aside at appropriate locations within each partition in order to provide the buffer circuit for the interconnection buses as they pass directly through a partition which does not make use of the signals so they may be properly transported to the partition in which they will be used. This is accomplished during the design process by, after forming the initial structural layout, determining the partitions which are required to be connected to each other, and then establishing feed-through interconnection locations, after which a floor plan is created that includes the appropriate buffer stations located within the partitions through which the signal passes.

BRIEF DESCRIPTION OF THE SEVERAL VIEWS OF THE DRAWINGS

FIG. 2A is a top plan view of a conventional SOC layout that includes channels to carry the various interconnect lines.

FIGS. 2B and 2C are enhanced views of a portion of FIG. 2A.

FIGS. 7A-7B illustrate a process of restructuring partitions according to embodiments as described herein.

DETAILED DESCRIPTION

FIGS. 3A-3F illustrate views of a channel-less integrated circuit architecture 40, according to one embodiment. The channel-less integrated circuit architecture 40 is formed on a semiconductor substrate 51, which is processed and then separated into a plurality of die, each die having a multicore architecture that includes numerous bus lines that are not routed in channels. This multicore architecture may be as simple as various sections of electronic circuits that work together to form a specific die, such as a processor or an application specific integrated circuit (ASIC). Each integrated circuit includes disparate electronic circuits, each formed in the substrate and each configured to perform a specific function. Together, these different electronic circuits perform the functions of the integrated circuit. These electronic circuits may be isolated from each other in the substrate and coupled to each other with electrically conductive lines is the various layers above the substrate.

Figure 3A:
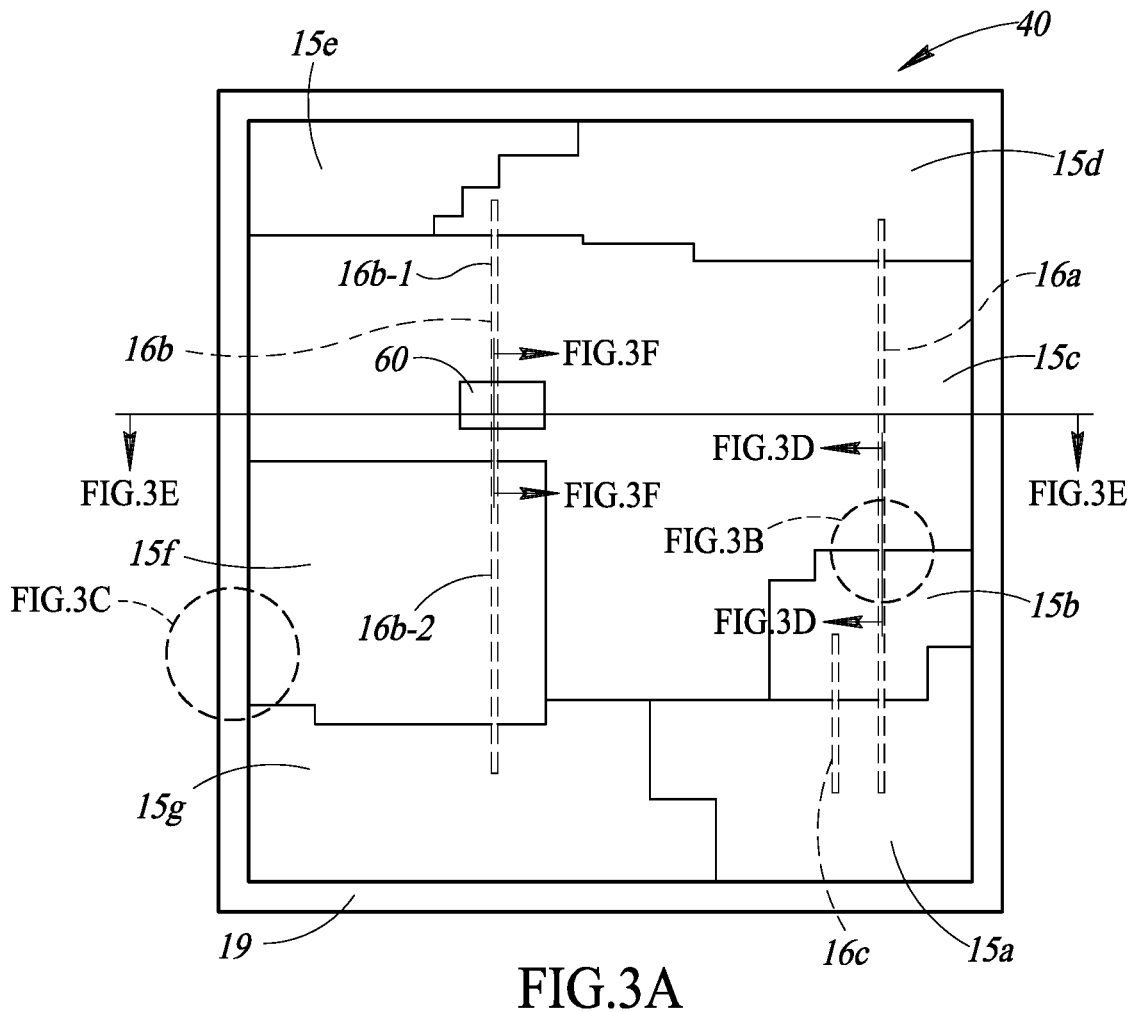
FIG. 3A is a top plan view of an integrated circuit die in which separate sections of the integrated are physically next to each other and separate sections are coupled by simplified electrical connections, according to embodiments of the present disclosure.

The channel-less integrated circuit architecture 40 of FIG. 3A includes a plurality of buses 16 routed directly between components within sections or partitions 15*a*-15*g* without the use of dedicated channels that occupy space on a top surface 52 of the chip. More particularly, each partition or section 15*a*-15*g* corresponds to one disparate or discrete electronic circuit formed in the substrate. As illustrated in FIG. 3F, circuitry 53 within partition 15*c* is physically and electrically separated from circuitry 54 within partition 15*f*. In some circumstances, the circuitry 53 will never communicate with the circuitry 54. Although these two partitions 15*c*, 15*f* are adjacent, the circuitry 53, 54 may not need any information from the adjacent partition in order to operate properly. They may receive power from the same power source and may be coupled to the same ground connection; however, no signals are passed from circuitry 53 to circuitry 54 and vice versa. The dashed line 71 illustrates the boundary between partition 15*c* and partition 15*f*.

The channel-less integrated circuit architecture 40 includes a number of integrated circuit components, the sections or partitions 15*a*-15*f* As discussed above, each of these components is placed or arranged within a selected region (area), or partition 15, of the total chip area. Each partition is allotted a specific portion of the surface of the semiconductor substrate in which the various active and passive components are formed. Within each section, the active and passive components are connected to one another via local lines, routed well below the top surface of the chip. These local lines remain within the area allotted to the particular partition 15; they do not travel outside of the area. If the partition is to communicate with and receive or transmit information to another partition, this is achieved with the simplified bus lines 16, which are formed in the uppermost electrical conduction layers of the die, such as layer 56.

In this channel-less design, boundaries of the partitions no longer are physically separated by the channels and instead the partitions abut one another. There is no physical component above the substrate that defines the boundaries. The boundaries may be visible in the substrate, such as isolation trenches that separate the various partitions. The junction or boundary 42 between partitions is illustrated by a solid line in FIGS. 3A and 3B. In the cross-section of FIG. 3D, the boundary 42 is shown as a dashed line. As is shown in FIG. 3D, the boundary 42 is not a physical structure and the partitions are simply formed in adjacent areas of the substrate 51.

The buses 16 are formed in one of the top levels of the die, but not on a top surface 52. The buses 16 can be liner connections that provide a signal from on partition to another, for example, bus 16b couples partition 15g to partition 15d. Buss 16b passes over partition 15f and partition 15c. The bus 16b does not pick up or transmit any data signals from partitions 15f and 15c.

Figure 3B:
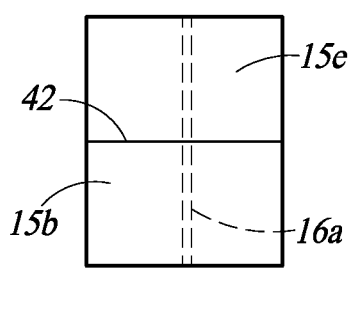
FIGS. 3B-3F are enhanced views of die of FIG. 3A.
Figure 3C:
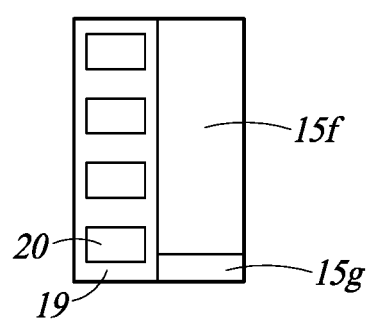
Figure 3D:
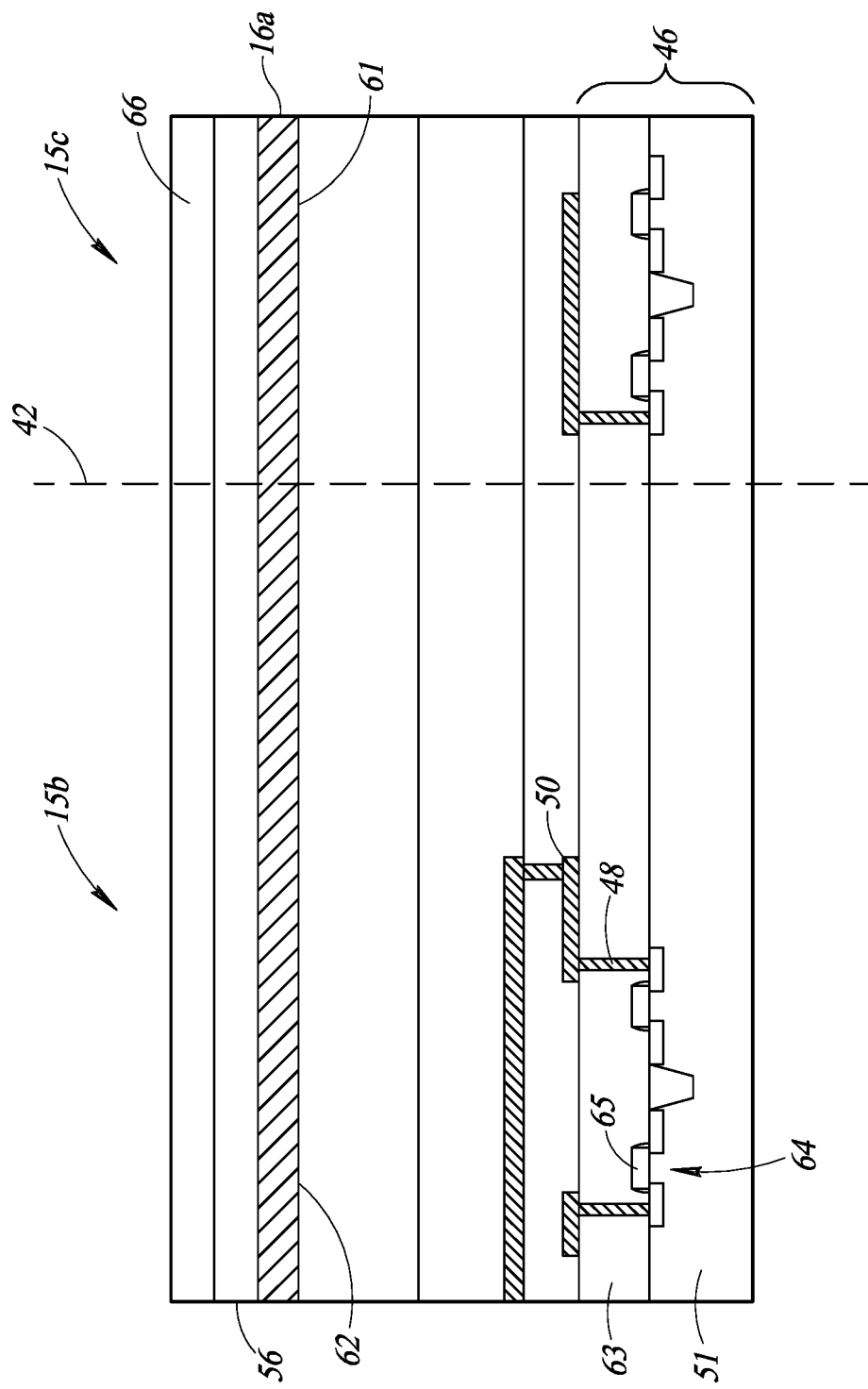

If a bus 16 passes from one partition to the next, such as bus 16a in FIGS. 3A and 3D, which passes from partition 15b to 15c, carrying a signal from partition 15a to partition 15d, the portions of bus 16a that are from partition 15b and those from 15c directly abut one another at junction 42 as shown in the enlarged view of FIGS. 3B and 3D. In the example shown, the partition 15a communicates with partition 15d via the bus labeled 16a. The bus 16a passes over and through partitions 15b and 15c. Partition 15a is coupled to the partition 15b on bus 16c, i.e. can transmit a signal from one to the other. Similarly, partition 15d is coupled to partition 15g by the interconnection bus 16b. As can be seen, the buses 16 run directly, in a linear fashion, from one partition 15 to another, passing through and over circuitry in intervening partitions, such as partitions 15c and 15f. The interconnection bus lines 16 may be all or substantially within a layer below, but close to, the surface of the substrate. Additionally or alternatively, the interconnection bus lines may be routed vertically to underlying layers by way of interconnection vias and contacts formed in the integrated circuit die 40, such as vias 67, 57 in FIG. 3F.

FIG. 3C is an enhancement of an edge ring 19 that abuts partitions 15g and 15f. In this channel-less design, there is no channel between the edge ring 19 and the partitions 15g, 15f. The edge ring 19 includes contact pads 20 that provide electrical connections to external devices, such as other die or a printed circuit board. In some areas of the die, there may be a power or ground transmission line between the edge ring and the partitions.

Exposed wiring on the surface of the die is limited to a peripheral area (the edge ring 19) around the edges of the channel-less integrated circuit chip 40. Consequently, no substantial portion of the total chip area is dedicated to the buses 16. There several linearly oriented dedicated bus lines between partitions that need to communicate with each other. As noted above, these dedicated bus lines pass over intervening partitions that do not receive the communication signal provided on the dedicated bus.

When a bus 16 is long, such as 16a, one problem that arises is that the signal loses strength as it passes from partition 15a on one side of the die to partition 15d, located on the other side of the die. Because of the distance over which the bus signals are propagated, and the low voltage and current desired, signals that travel between partitions 15a and 15d must be reinforced, or otherwise refreshed at various intermediate locations between the two partitions in order to ensure that the signal is not degraded or lost completely due to noise, line losses, or other transmission problems. Accordingly, a number of buffer circuits are provided along bus 16a in order to refresh and strengthen the signal as it is carried on the interconnection lines from the partition 15a to the partition 15d. A buffer circuit, such as buffer circuit 60 in FIGS. 3A and 3F, is any circuit that strengthens and refreshes the signal as it passes along the signal line. The buffer circuit 60 is positioned along transmission line 16b that provide a communication path between partition 15g and partition 15d. The buffer circuit 60 is physically separated from the circuitry 54 of partition 15f and the other circuitry 53 of partition 15c. The buffer circuit 60 is positioned completely within partition 15f, but does not provide data signals to any components in partition 15f.

The buffer circuit may be any one of a number of acceptable circuits, including an amplifier, a repeater circuit, a relay circuit, or any of a number of known circuits that accept a weak signal as input, strengthen the signal by boosting the voltage and/or current, and then put the signal back on the transmission line, which signal has been restored to its original voltage and current levels so that it may continue to travel toward its destination without incurring a net loss.

According to the principals of the embodiments discussed herein, the strength of a signal refers to the power with which the signal is propagated. There are at least two ways to increase the strength, increase the current of the signal and/or increase the voltage of the signal. As a signal is transmitted from a first location to a second location, the current might decrease due to parasitic elements along the path that place a node on the transmission line and bleed small amounts of current off the transmission line. The voltage may decrease as the signal is transmitted from the first location to the second. Namely, due to the resistance in the transmission line, there might be a reduction in voltage during the transmission along that line of a signal. As one example, assume a circuit in which a digital 1 has a value of 3 volts and a digital 0 has a value of 0 Volts. In such a system, the digital value of a signal at 1.5 V cannot clearly be determined. Further, if the signal has a value between 1.3 V and 1.7 V, some circuits might make an error in properly recognizing that signal as a 1 or a 0.

If a digital signal having a value of 1 is placed on the transmission line, bus 16, the signal having a value of 3 volts, as the signal travels along the line, the voltage may drop to 2.8 volts. Then, at a farther point along the line, it might be 2.5 V or 2.3 V. While it would still be considered a logical 1 at a value of 2.3 volts, if it drops much further, it might reach a value at which it might be interpreted by some circuits as a digital 0. It desirable to ensure that the voltage does not change, (decrease or increase), by an amount that is sufficient to be considered to have changed from its original value. Accordingly, the buffer circuit will receive as an input the signal at 2.3 V and output the signal at a full 3 V. Alternatively, the buffer circuit may receive 0.7 volts and output it as 0 volts. It may also increase the current in the signal or increase both the voltage and the current. The buffer circuits may, in some instances, include error correction circuits, noise cancellation circuits, and other circuits, in order to ensure that the original signal which was sent by a component within partition 15a is properly refreshed and continues to be transmitted along the line towards its destination of partition 15c. Depending on the type of circuitry used, a buffer circuit may involve several dozen transistors in order to provide the proper amplification and buffering or, in some instances, may include several hundred or a few thousand transistors. The number of transistors in a buffer circuit is significantly smaller than the number of transistors in the active or other circuitry within a partition.

An individual partition 15, for example, may be included in the range of 4-8 million transistors. The buffer circuits are placed at the necessary locations along the transmission bus line 16a by providing connection vias, contacts, and interconnection lines from the bus 16a down to the silicon substrate where the buffer circuits are located. A very small space is allocated out of the partition in order to provide the buffer circuits for the bus line. Namely, a small amount of the area directly underneath the bus line 16b is set aside and not used by the partition 15c. This small area which may contain, as previously stated, several dozen transistors or, in some cases, a few hundred transistors, provides the buffer circuit which is dedicated for buffering the signal traveling on the bus line 16a from partition 15a to 15d. It is therefore not used by the partition in which it is located but rather, is set aside for use as a buffering station for various bus lines that pass through the partition.

FIG. 3D shows a cross-sectional view of an exemplary junction or boundary 42 between the partition 15b and the partition 15h of the channel-less integrated circuit architecture 40, according to one embodiment. Generally, the channel-less integrated circuit architecture 40 may have in the range of eight to fifteen metal layers, with nine to twelve metal layer circuits commonly used. Interconnection lines for the bus 16a will usually be carried in the upper metal layers, just below the surface of the die, for example, metal layers 9-12 in a channel-less integrated circuit architecture 40 having twelve metal layers. In a channel-less integrated circuit architecture 40 that has ten metal layers, the interconnection lines for the bus 16a would normally be carried in layers 7-10. FIG. 3D shows exemplary interconnects in a top layer 56, which includes the buss 16a. A first side 61 of the bus 16a that is in partition 15c is abutting a second side 62 of the buss 16a that is in partition 15b at the junction 42. It is not required that the abutting interconnects be in the top-most metal or conductive layer, however, it may be more convenient and efficient to use the uppermost layer 56 for the buses 16 in the channel-less integrated circuit architecture 40.

Buffer circuits are formed in a transistor layer 46 of the channel-less integrated circuit architecture 40. The transistor layer 46 includes the substrate 51 and at least one insulating layer 63. The transistor layer includes a plurality of transistors 64 having source/drains in the substrate and gates 65. Therefore, vias 48 from the interconnection lines 50 and the upper metal layers extend down to the silicon substrate 51. In FIG. 3D, the vias couple various components in partition 15b. These are separate from any buffer circuits associated with the busses.

Figure 3E:
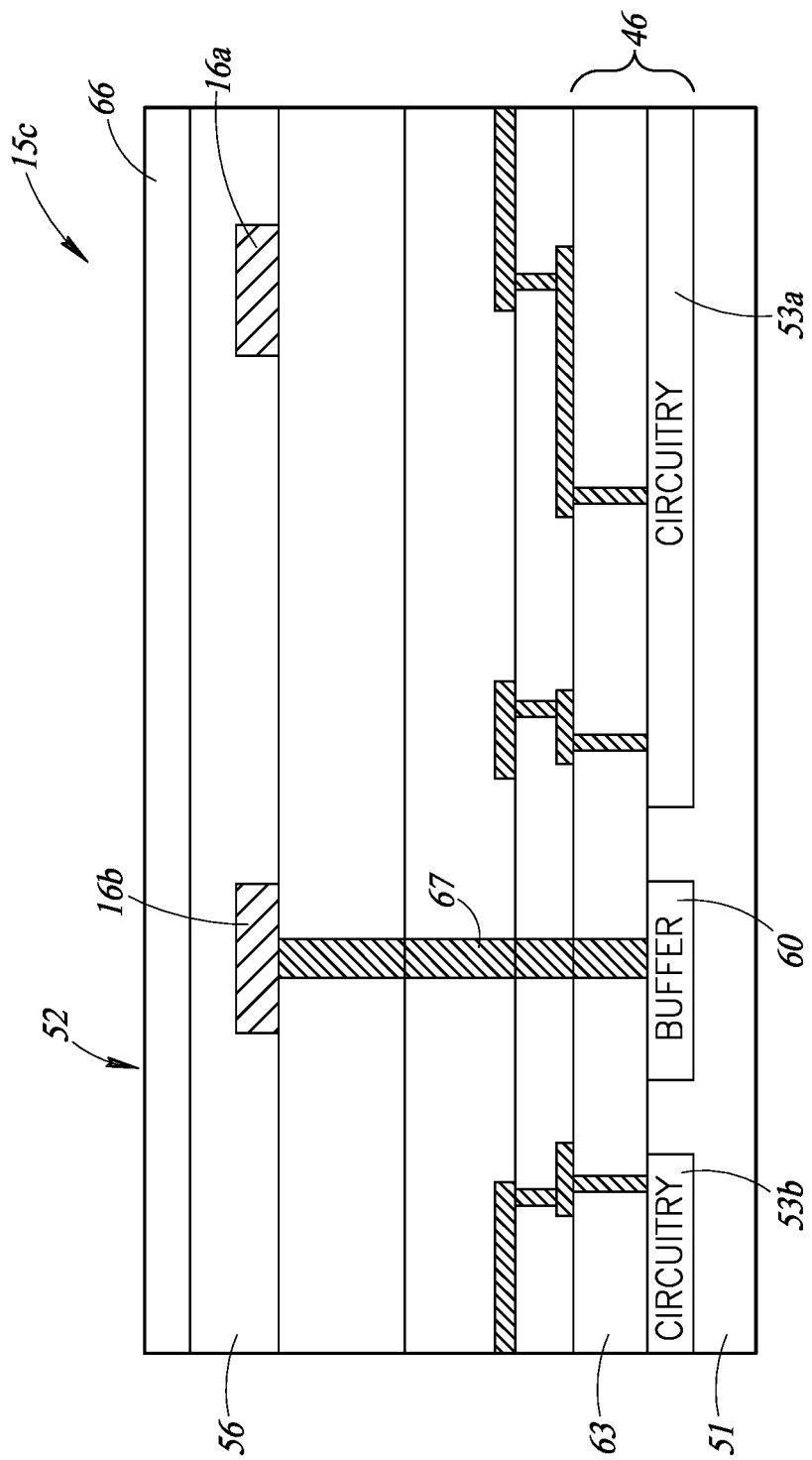
Figure 3F:
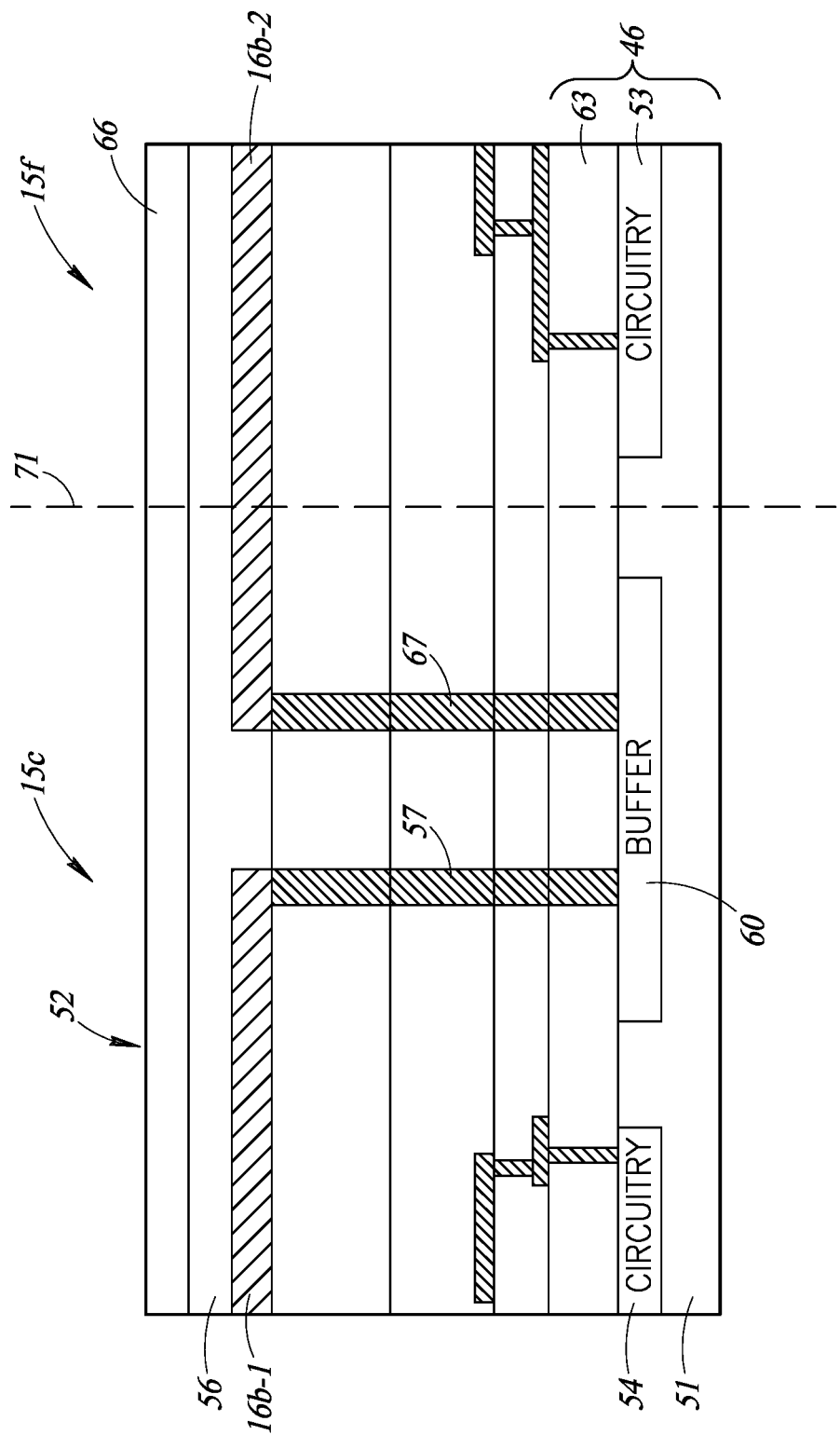

The vias 57 and 67 in FIGS. 3E and 3F provide an input signal to the buffer circuit, and then receive the refreshed output from the buffer circuit which is then placed back on the interconnection lines in the top metal layer and continues to pass along the bus 16a. This can be considered, in one respect, "punching through" the insulation layers that are between the top metal layer or bus and the substrate and then commandeering for allocation to the buffer circuit a very small footprint, generally taking up 100-200 square nanometers of space for the buffer circuit that is electrically isolated from the rest of the circuits in a particular partition 15 or a component 12. A top insulation layer 66 covers the buses 16. The busses 16 are formed several layers above the transistor layer 46 such that the busses 16 pass over or are positioned directly above the active circuitry of each partition. The busses can pass over active circuitry and not be in electrical communication with the active circuitry, such that a data signal may be transmitted in 16a over the circuitry and transistors of partition 15b without providing the signal to the circuitry of partition 15b. As in FIG. 3E, the partition 15c includes the buffer circuitry 60, which is surrounded by the partition circuitry 53a, 53b. The signal carried by the bus 16b is not used by the circuitry 53 and is simply amplified or boosted by the buffer circuitry. Although the buffer circuitry is formed next to the circuitry in the substrate, the buffer 60 is separate and distinct from the circuitry 53. The only electrical signal they share may be for power.

In FIG. 3F, a first portion 16b-1 of the bus 16b travels from partition 15g through partition 15f and then via 57 transmits the signal into the buffer 60. A second portion 16b-2 of the bus 16b leaves the buffer 60 and continues moving the signal toward partition 15d.

Figure 1:
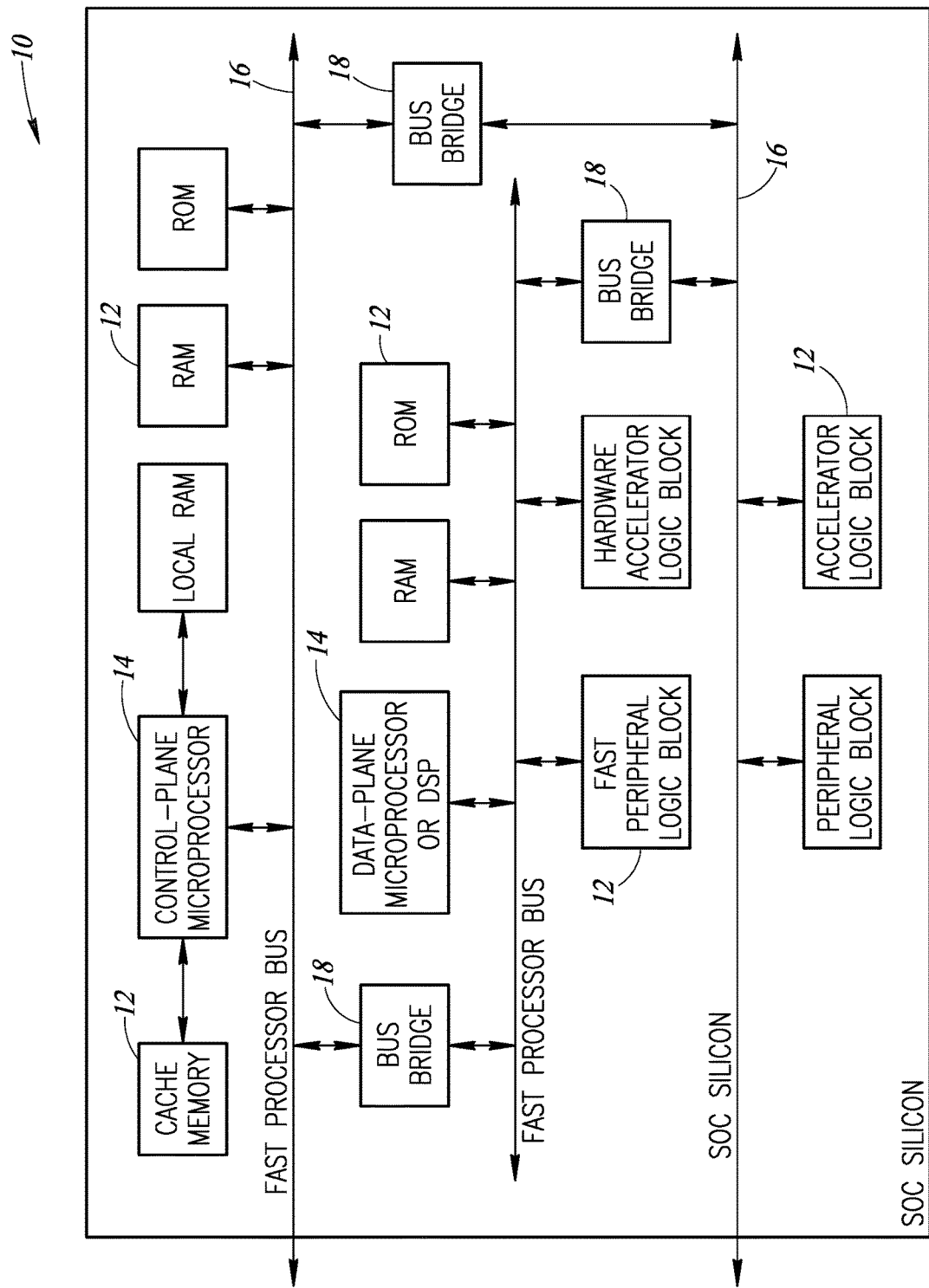
FIG. 1 is a schematic block diagram of one example of a system-on-chip (SOC) integrated circuit die and multiple bus interconnect lines.
Figure 4:
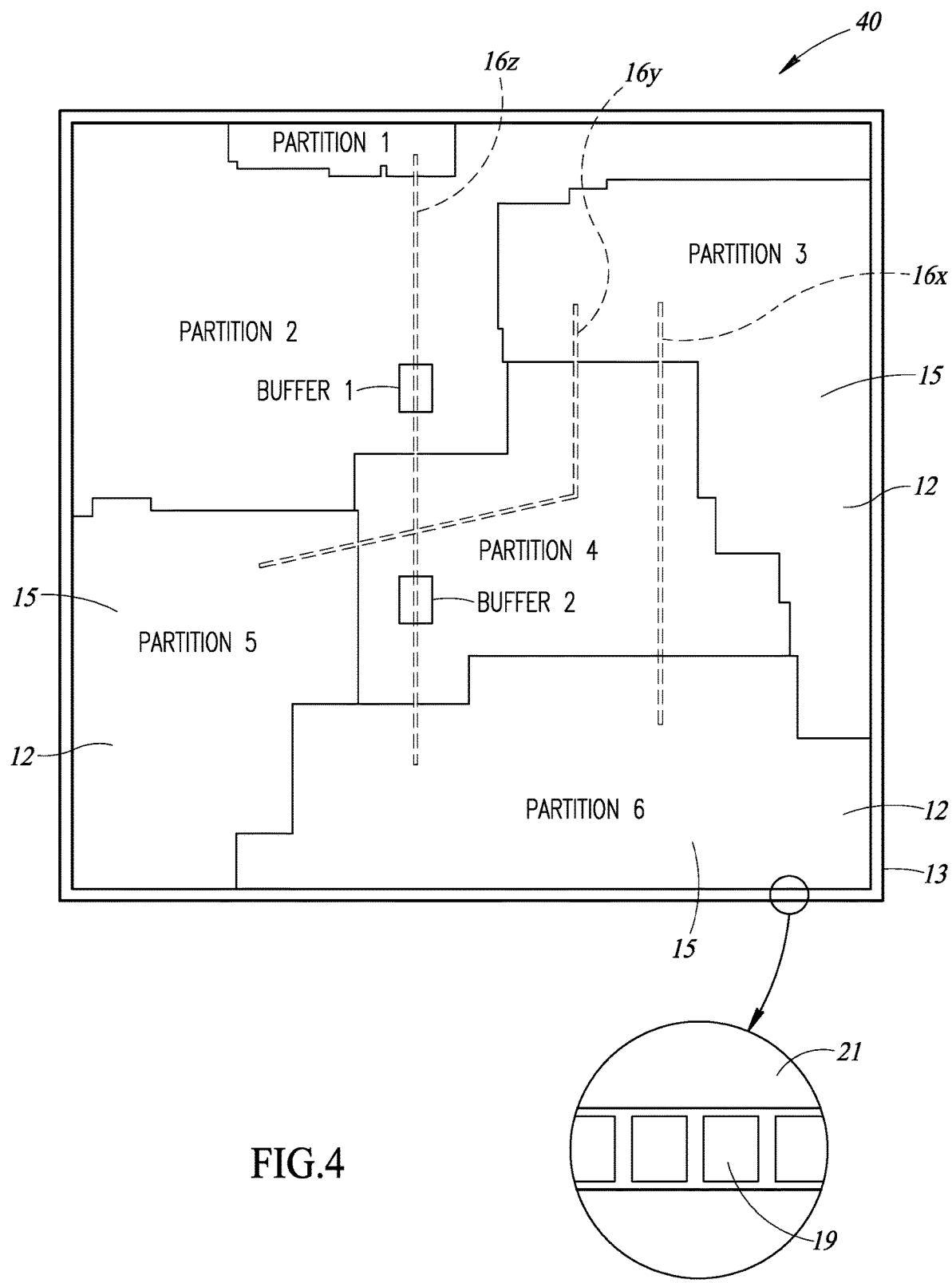
FIG. 4 is a schematic top plan view of an integrated circuit architecture divided into six design unit partitions according to the embodiments as disclosed herein.

FIG. 4 is a schematic example of a partition layout of the channel-less integrated circuit architecture 40, according to one embodiment. In the example in FIG. 4, six partitions 15 are shown, labeled as partitions 1-6. Each one of the partitions 1-6 contains one or more support components 12 and microprocessors 14 corresponding to those shown in FIG. 1. As can be seen in FIG. 4, the partitions 1-6 are shaped to be complimentary to one another so that they directly abut against each other with no space existing between partitions on the top level of the die. In cross-section, there is no physical boundary shown in the layers formed because they are all formed simultaneously during the wafer processing.

The abutting is more relevant to the design process where each support component and each microprocessor is designed by a separate team. Each team determines what transistors and other electrical components are needed to achieve the support component or microprocessor that they are designing. Software then can be used to determine how to make the various support components and microprocessors fit on the same, single die. Each support component or microprocessor may be associated with a partition.

Each partition is self-contained in that it includes all of the transistors and components needed to perform its specific operation. As some partitions need to communicate with other partitions, then the buses 16 are identified. As this is done at the end of the design process, the buses are simply added to the uppermost metal layers of the die once the areas on the substrate have already been allotted to the various partitions.

As the positions of the buses are selected, which can be a straight line, the most direct path from one partition to another; the design teams determine where a buffer circuit may be needed. As the buffer circuits are very small in comparison to the support components or microprocessors, it is easy to identify a location in which a buffer circuit can be positioned, even within a partition that is simply below the bus (not receiving the signal for processing purposes from the bus).

In particular, a number of rules are established in order to create an integrated circuit architecture having no channels, or, in some instances, very few channels. A first rule is that the partitions are all-inclusive units, meaning that all of the necessary contact pads, analog cells, clock sources, and the like, are located within a particular partition. A second rule is that pin nets are created only at the top metal layer with the specific rules for the interconnection wires that punch through the partitions 1-6 to make connections to the buffer circuits located in the silicon substrate. For example, the pin nets refer to specific metal layers, such as metal layers 8 and 9. Only these two metal layers are permitted to have vias and contacts that electrically connect to the buffer circuits and to those partitions through which the transmission lines pass but which do not originate or receive the signal. As can be seen in looking at FIG. 4, there are no wires or blocks at the very top level; the buses are shown in dashed line because they are below the top surface. Further, all partitions are formed with fully complimentary boundaries to directly and fully abut each other. This saves on the overall space available on the die for components.

For clarity, only three buses 16 are shown in FIGS. 4: 16x, 16y, and 16z. Bus 16x connects partition 6 to partition 3; bus 16y connects partition 3 to partition 5; and bus 16z connects partition 6 to partition 1. As can be appreciated, a standard channel-less integrated circuit architecture 40 will have many hundreds of interconnections, represented herein by only three such buses 16.

Viewing FIG. 4 in further detail, it can be seen that interconnection line 16z extends from partition 6, which is on the lower side of the chip across partitions 4 and 2 to reach partition 1. Interconnection line 16z is selected to provide the shortest possible path between circuits located in partition 6 that must be connected to circuits located in partition 1, without regard to the intervening partitions through which the bus line 16z passes. Moreover, signal routing is selected without regard to the types of circuits that the bus line 16z will pass over. Consequently, bus line 16z may pass through, for example, memory circuits because the middle interconnection lines that form the bus 16z are located at the upper metal levels, for example, metal levels 7-10, which are well above any of the operating circuits inside the individual partitions. Accordingly, these upper metal levels can be allocated for the bus line 16 to interconnect the various partitions to each other.

In one embodiment, the integrated circuit die can be considered as having a large number of logical units on the chip of different types. In broadly stated terms, both a microprocessor 14 and a support component 12 can each be considered a logical unit. Both of these components contain circuits that carry out logical functions and are composed of transistor logic and perform logic operations. Each of these logical units 12 and 14, is placed within a partition 15 and connected to other logical units, whether 12, 14 or another type of logical unit, with local interconnection lines that are internal to a partition and with buses that run above. In the example shown, one partition 15 is physically next to other partitions 15, each partition usually including logical units of both types, microprocessor components 14 and support components 12. In particular, the logical units of partition 5 are connected to partition 3 along two interconnection lines labeled 16y. The logical units of partition 6 are coupled to logical unit 12 of partition 3 on interconnection line 16x.

As can be seen, these interconnection lines 16 run directly from one partition to another, passing above other partitions. As previously discussed, when a signal must traverse the entire chip between opposite sides, as the signal leaves the first partition it may not have sufficient strength to reach the destination partition. In the prior art, such a situation was accommodated by having dedicated channels that contained buffer circuits to refresh and buffer the signals as they were carried along the channels. The channels were outside and along the boundaries of the partitions and were dedicated channel regions that contained the buffer circuits. According to the embodiments disclosed herein, rather than providing a separate channel that is dedicated to buffer circuits, and through which each of the interconnection buses passes, there is a provision made to allocate a very small region (such as Buffer 1 and Buffer 2), for example, a few hundred square nanometers of chip real estate, that is set aside near the center of a partition through which the line 16z passes in order to provide buffer circuits for the signal passing from partition 6 to partition 1. In particular, partition 4 will have one buffer circuit Buffer 2 positioned approximately at a center of the portion through which bus 16z passes, directly below line 16z in order to refresh and strengthen the signal traveling between partition 6 and partition 1. Partition 2 will also contain one or two buffer circuits, such as Buffer 1, directly below line 16z that are set aside as dedicated space, allocated within the partition and not used for the main function of the partition. Buffer 1 and Buffer 2 will be isolated and not communicate with the other elements, processors or support components formed in the associated partition.

For example, partition 2 may include a CPU having various microprocessor functions, with support components 12 including ROM, RAM, dedicated registers, and other circuits that are common to a microprocessor, or circuits which are dedicated for use in the components 12 that make up partition 2. The buffer circuits Buffer 1 serving the transmission line 16z are not part of this component 12 but rather are established in a set-aside dedicated area that is just for the buffer circuit of the transmission line 16z. This does require some small amount of real estate in the silicon substrate, however, this is significantly less real estate than is necessary for the wide channels 17 that are used in the prior art as shown in FIGS. 2A and 2B. In particular, the bus line 16z does not extend through a dedicated region for the bus line and instead, nearly the entire path of the bus line 16z passes directly through useful circuits that are in partitions 4 and 2 and make up the functioning circuits of that partition. The bus line passes over the useful circuits that are in the partitions 4 and 2. Only at one or two locations along its path is there a buffer circuit located directly underneath the interconnection path that receives the signal, refreshes it, and places it back on the transmission line 16.

Other examples of transmission lines shown in FIG. 4 include the bus line 16x that connects partition 6 to partition 3, and the bus line 16y that connects partition 3 to partition 5.

An edge region 13 (pad ring) of the die contains a plurality of contact pads 19 that are configured to send and receive signals to and from the die to other external components. The contact pads 19 are coupled to various components in the different partitions. By moving the buses 16 to a central portion of the die, the substantive or active regions 21 of the partitions can be formed to directly abut the edge portions 13, such that there is not a channel region between the active region 21 and the edge region 13.

As described above, when an interconnection line 16 is long, such as 16z, the signal can lose strength as it passes from partition 6 on one side of the die to partition 1 on the other side of the die. Because of the distance which is required to be propagated, and the low voltage and current desired to be used, signals that travel between logical units must be reinforced, or otherwise refreshed at various locations between the two partitions in order to ensure that the signal is not lost due to noise, line losses, or other transmission problems. Accordingly, the buffer circuits are provided along the signal line 16z in order to refresh and strengthen the signal as it is carried on the interconnection lines from partition number 6 to partition number 1.

The buffer circuits Buffer 1, Buffer 2 can be any circuit which strengthens and refreshes the signal as it passes along the signal line. The buffer circuit used can be any one of the many buffer circuits known in the art today. Among the buffer circuits known in the art are a pair of CMOS inverters that receive an input slightly less than a full digital one and output a signal at a full digital one. Other buffer circuits include combinations of AND, NAND, OR and NOR gates. Buffer circuits that can both source and sink current are known, including those having either MOS and bipolar transistors or combinations thereof. The buffer circuit may be any one of a number of acceptable circuits, including an amplifier, a repeater circuit, a relay circuit, or any of a number of known circuits which receive a weak signal at its input, strengthen the signal by providing increased voltage or current or both, and then put the signal back on the transmission line, which has been restored to a higher, and in some cases, its original voltage and/or current levels so that it may continue to travel without loss toward its destination. The buffer circuits may, in some instances, include error correction, noise cancellation circuits, and other circuits, in order to ensure that the original signal which was sent by the first partition circuit 15 is properly refreshed and continues to be transmitted along the line towards its destination of partition circuit 15.

A buffer circuit may, depending on the type of circuitry used, involve several dozen transistors in order to provide the proper amplification and buffering or, in some instances, may include several hundred or a few thousand transistors. An individual partition 15, for example, may be included in the range of 4-8 million transistors. The buffer circuits are placed at the necessary locations along transmission line 16*z* by providing connection vias, contacts, and interconnection lines from the line 16*z* down to the silicon substrate where the buffer circuits are located. A very small space is allocated out of the partition 15 over which the line passes in order to provide the buffer circuits for the line 16. Namely, a small amount of the area directly underneath the line 16 is set aside and not used by the partition 15 at a few locations inside that partition. This small area which may contain, as previously stated, several dozen transistors or, in some cases, a few hundred transistors, provides the buffer circuit which is dedicated for buffering the signal traveling on line 16 from partition number 6 to partition number 1. This area is therefore not used at the particular locations inside of partition 4 and 2 in which the buffer is located but rather, is set aside for use as a buffering station for bus lines that pass over the partition. Generally, a long line, such as 16*z* might have 3 to 5 buffer stations circuits. Therefore, at 3 (or maybe 5) different locations between partition 6 and 1, vias and contacts connect down to the substrate so that they can reach the buffer circuits located within partition number 4 and number 2. Some lines 16 might only need a single buffer circuit and some might have none. The buffer circuit logic takes up only a small space where it is located, which will mean that only a small area in the partition that holds the buffer circuit is set aside within each partition. Further, the buffer circuits are located only where they are needed and not along the entire length of each line 16.

The bus routes may be selected based on partitions that are formed to have similar or the same power domain. For example, with reference to FIG. 4, the buss 16*y* transmits from partition 5 to partition 3, passing through partition 4. In this example, partition 4 is in the same power domain as partitions 3 and 5 where partition 2 is in a different power domain.

Figure 5:
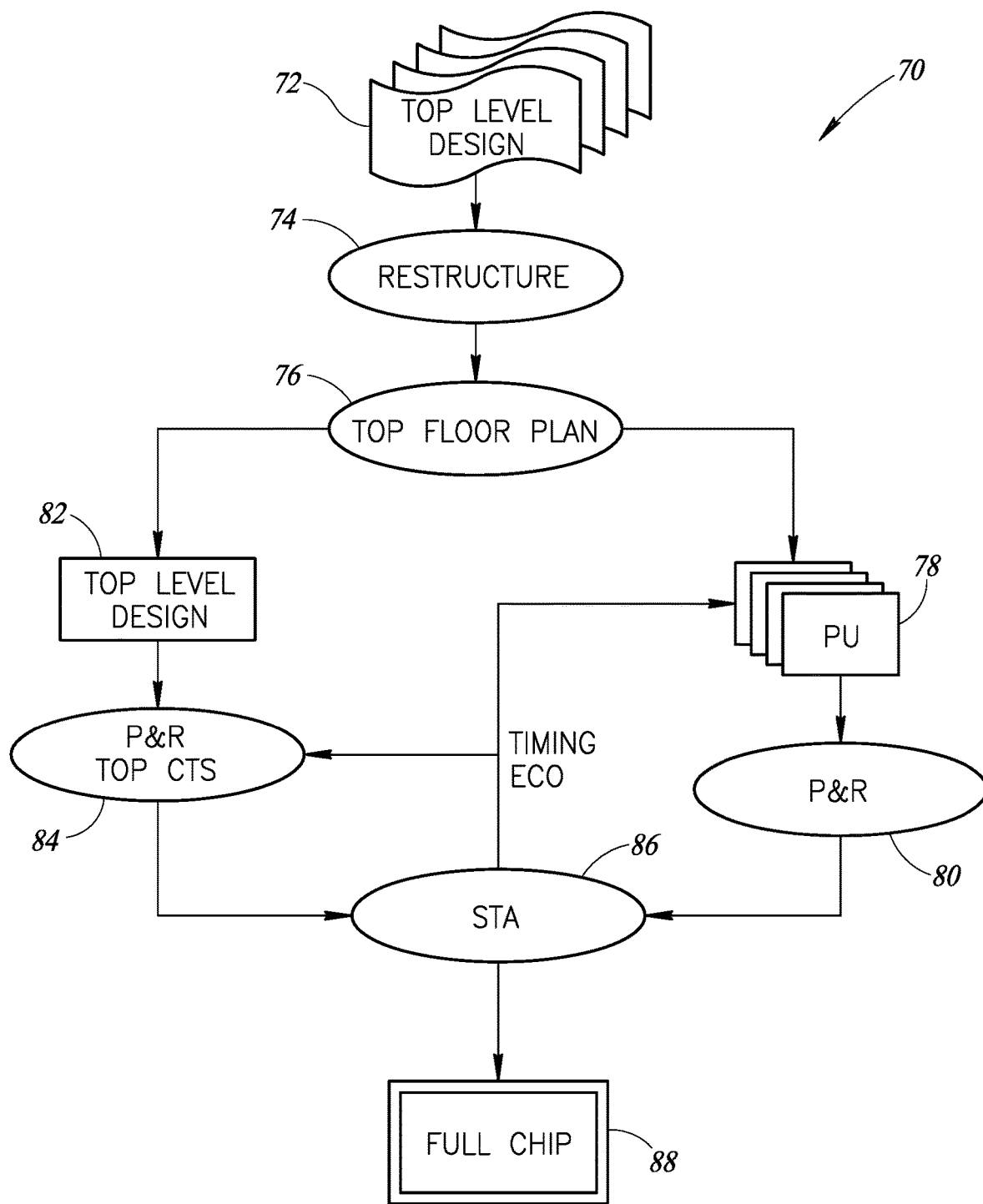
FIG. 5 is a flowchart of a circuit design process for circuits that include channels, according to the prior art.

FIG. 5 shows a sequence of steps in an existing design process 70 of a type commonly used today by integrated circuit design companies to organize and sequence tasks.

At 72, the individual processors 14 and support components 12 to be used in the conventional integrated circuit die 10 are initially designed. As previously explained, each integrated circuit chip contains a large number of components 12, and each component is sufficiently complex that a single team of design engineers is selected to design each component as a separate design unit. Thus, the power supply design unit may have a team of five to six designers, the CPU may have a team of a dozen designers, and the various memories also may have between six and fifteen people on the design team. After each design unit is completed, it is checked and tested to ensure that it is ready for assembly into the final top level design for the integrated circuit architecture 40 as step 72 is completed. This is referred to as a top level design, the specifics of each logical unit to be incorporated into a single die.

At 74, the logical units are organized into partitions 15. In some instances, more than one design unit may be located in a single partition. For example, normally all portions of the microprocessor 14 will be within a single partition that may also include various types of memory such as ROM, RAM, EEPROM and the like.

At 76, a top floor plan is laid out with specifies boundaries for each partition 15, i.e., it is restructured. The boundaries then define locations into which the various channels 17 will be formed. The channels 17 match and follow the boundaries between the partitions and carry the interconnection lines between the logical units. The bus architecture is then laid out and the channels 17 created as shown in FIG. 2A, to connect the various partitions 15 to each other. The routes of these interconnection lines are circuitous and are not direct paths.

At 78, after the top floor plan is completed, each design partition unit (PU) or logical unit, corresponding to a partition 15, is organized in as compact and efficient a manner as possible and the location of connection pins is decided. The partition unit layouts are generated in parallel with one another.

At 80, the design partition units are arranged on the die by performing a place-and-rotate (P&R) operation.

At 82, in parallel with steps 78 and 80, the upper metal levels are designed so as to interconnect all of the partitions 15 according to the channel design, which was developed in step 76.

At 84, the design continues with the placement and rotation of the upper metal layers according to the top level design, together with the clocks and the timing between the various partitions. A clock tree synthesis (CTS) operation couples clock signals to multiple synchronous elements, making use of a clock tree buffer. The clock tree buffer compensates for losses in timing, and this allows connecting a clock signal to a plurality of components.

At 86, a static timing analysis (STA) is performed to calculate how many buffers are needed along a particular communication path, and to confirm that the physical design layout meets pre-determined targets that will ensure proper circuit timing. As a result of the channels taking a circuitous path, there are several buffers used to ensure the signal strength remains high enough to maintain the data.

At 88, the full chip design is completed. These are the steps of the current design process that is known in the art.

Figure 6:
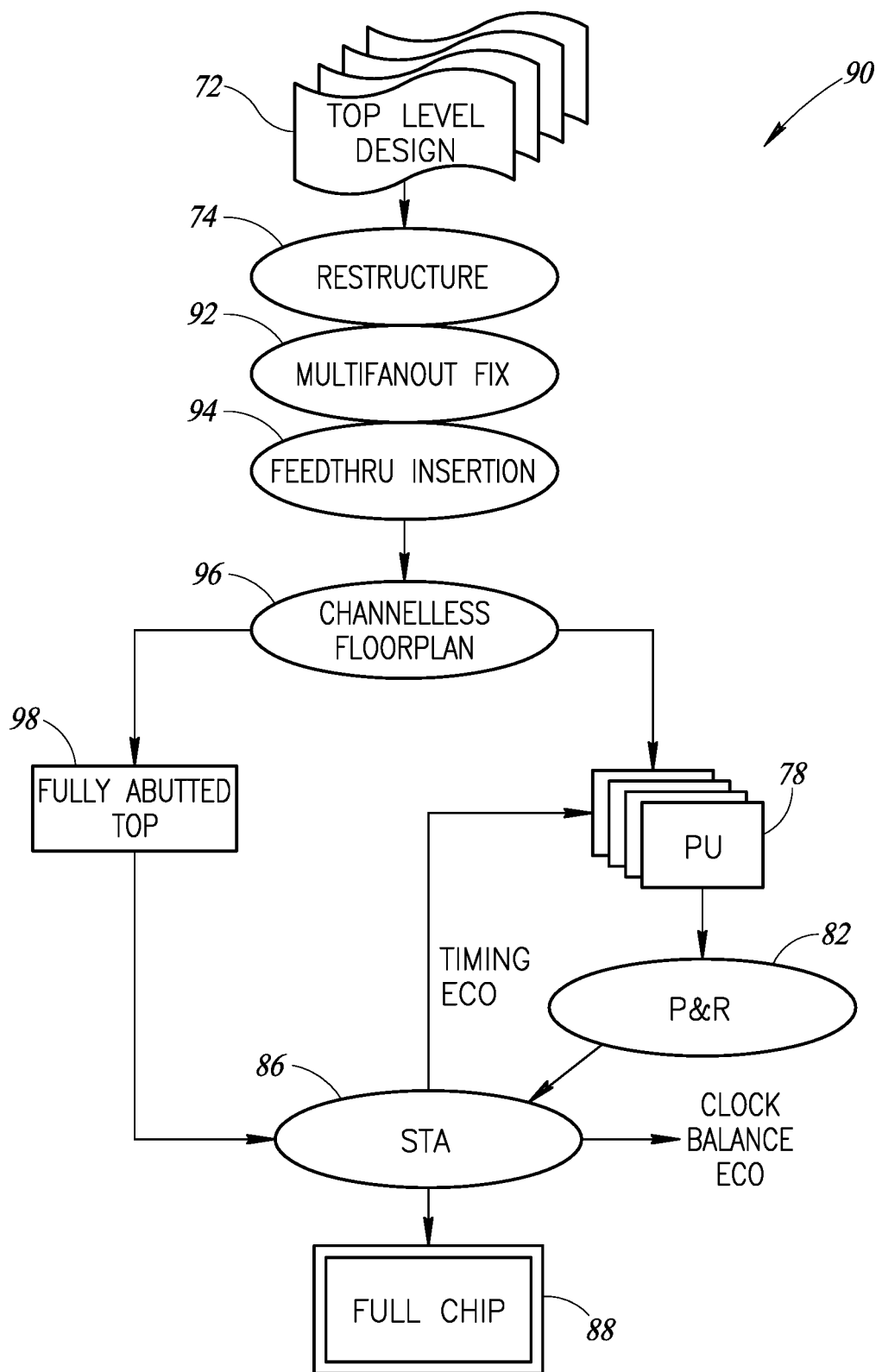
FIG. 6 is a flowchart of a channel-less circuit design process according to the steps as disclosed herein.

FIG. 6 shows a sequence of steps in a design method 90 for use in organizing tasks to create the channel-less integrated circuit architecture 40. FIG. 6 illustrates the design steps for a chip in which the interconnection lines run directly between various components and partitions without the use of designated channels to carry the bus interconnect structures. The design method 90 is used to ensure that wiring is not present or minimized at the top level of the integrated circuit die 40. The design method 90 can be used to create a new chip design, or to adapt an existing channel-based chip design to create a channel-less design.

Steps 72 and 74 are generally the same as in the conventional design, in which design units for individual components 12 are formed in parallel at 72, and then the design units are organized into the target partitions in step 74. To reiterate, separate design teams design their own logical unit, ensuring the appropriate components are included in their logical unit for their logical unit to function properly. If signals are to be received from a different logical unit, a "pin" is noted, which represents a signal coming into the logical unit from a different, disparate logical unit. Sometimes there are other logical units physically positioned between the two logical units that are communicating such that that two logical units are not abutting. However, the rules for arranging the partitions at 74 are generally different for a channel-less design than for a channel-based design. Thus, at 74, the channel-less design is re-structured to arrange the partitions. With the channel-less design, there is more area available to teach of the logical units as the channels took up significant real estate on the substrate and the top metal levels. In the channel-less design, there are no physical boundaries created by the channels such that in a cross-sectional view or top down view, adjacent logical units have dielectric material between them. For example, the boundaries 42 and 72 of FIGS. 3D-3F.

By designing the partitions to be all-inclusive and by placing partitions adjacent to one another based on their communication needs, the overall chip design can be made more efficient because interconnection lines are shortened or eliminated. In particular, each partition is designed to have all local communication formed in the lower metal levels of the die. Each logical unit has its own internal communication lines that do not extend outside boundaries of the logical unit. These units are self-contained with respect to local communication.

For example, by using this method, a conventional arrangement 73 of design units shown in FIG. 7A may be further re-arranged according to a channel-less layout 75 that includes partitions 15, labeled 15-1 to 15-4, as shown in FIG. 7B. The conventional layout includes a core logic section with components 12a, a pad ring section with input/output pads 12c, and an analog devices section 12b. Utilizing the present method organizes the various related components into partitions 15-1-15-4. This is performed early in that a design team designs their partition to be self-contained, including having related input/output components 12c physically within boundaries of the relegated partition. For example, partitions 15-3 and 15-4 each include input/output components 12c, while partitions 15-1 and 15-2 do not need external input/output components. By identifying all of the partition's area needs in the first step, the amount of actual area of the substrate needed for the partition can be determined and allocated.

There may be, for example, a total of 100 design units arranged into six partitions 15. In the channel-less layout 75, it is recommended that all circuits of the integrated circuit chip 40, such as the digital components 12a, analog components 12b, the I/O components 12c, the interface units, memory, power circuits, and the like, be grouped into a set of top level partitions such that individual design units do not remain outside boundaries of each partition in the top level design. In particular, the partitions 15 are designed to be all-inclusive units. All pads, analog cells, clock sources, and other support components that will be needed to support a core microprocessor 14 in a particular partition 15 are contained within that all-inclusive partition. The partitions 15, shown in FIG. 7B as 15-1, 15-2, 15-3, and 15-4 are organized so that boundaries of the top units are stretched to be complimentary to each other without any additional wiring required in a channel. No space is allowed between adjacent partitions on the top level of the chip. To the extent possible, adjacent units that frequently exchange signals are abutted against each other, for example, a main memory partition, such as SRAM or DRAM will directly abut against an associated CPU partition, which makes the most use of that memory. Also, partitions in the same power domain may be adjacent to each other. The input/output circuits will be at the edge of the chip and directly abut against the CPU which frequently accesses the input and output signals, such as the pad ring or edge ring illustrated in previous figures. The partitions can be shaped, organized, and stretched to abut against each other in any desired physical fashion, an example of which has previously been shown in FIG. 4.

Each partition 15-1 to 15-4 is then designed with an open connection available in at least one or maybe two upper metal layers if the partition is to communicate with another partition. The restructuring provides space for available interconnection wires in the upper metal layers of the die. Preferably, all of the metal layers below the top three or four metal layers are contained within the partition itself. Two of the upper metal layers, such as layers 9 and 10, or, in a chip with fewer metal layers, layers 7 and 8, have room that is available and reserved for use by the net interconnection structure that forms the buses 16. The net is the various bus lines that overlap each other as they couple various portions of various partitions to each other. In addition, during step 74, the initial layout is performed of the top-level nets that will provide the interconnection wires, which will connect one partition to another.

At 92, after the partitions are generally laid out and their boundaries are defined, a multi-fan-out fix process is carried out. Rather than having many of the interconnection lines grouped together and passed as a single bus across the integrated circuit die 40 from one location to another, each individual circuit connection which is to carry a signal among partitions P1-P4 starts at the origin or termination of the signal and extends directly to the partition for the termination origin of the signal which is to be exchanged. These can be straight lines as opposed to the zig zag design of prior channel designs. In prior art designs, it is common to collect all of the interconnection lines into a common area so they take up a broad footprint across the die and are carried as a channel from one partition to another, or around the outer periphery of the integrated circuit die as shown in FIG. 2A. However, according to the channel-less design, it is preferred that just a few interconnection lines extend together from one partition to another. If one partition is connected to another partition by two separate interconnection lines that come from different parts of the partition, then separate paths are used and these are not required to be joined together. This creates simple and efficient paths from the transmitting partition to the receiving partition.

Figure 8B:
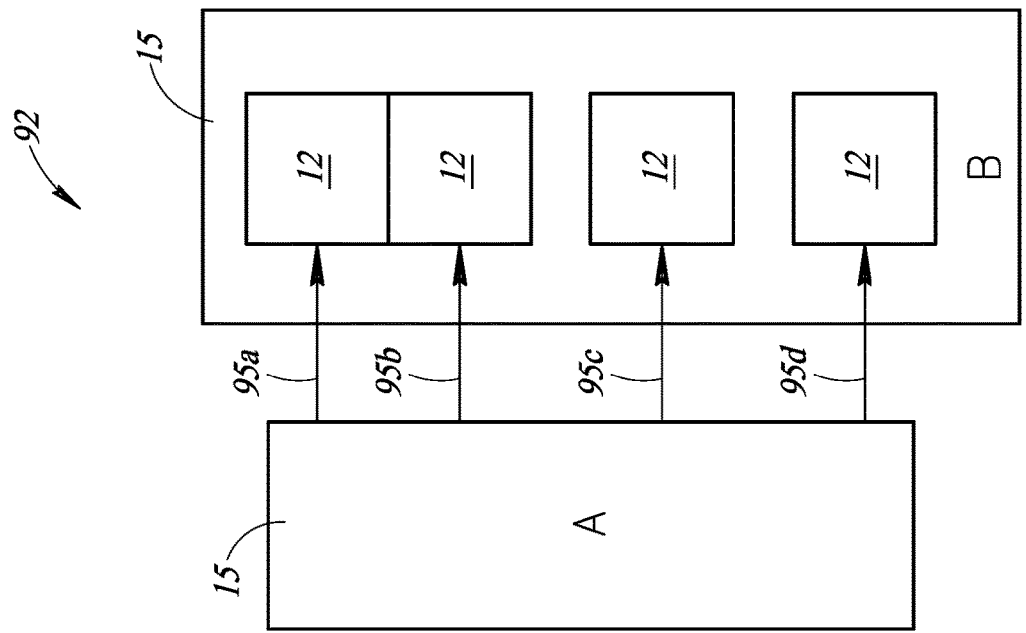
FIGS. 8A-8B illustrate a process of re-configuring multi-fan-out connections as one-to-one connections, according to one embodiment as described herein.
Figure 8A:
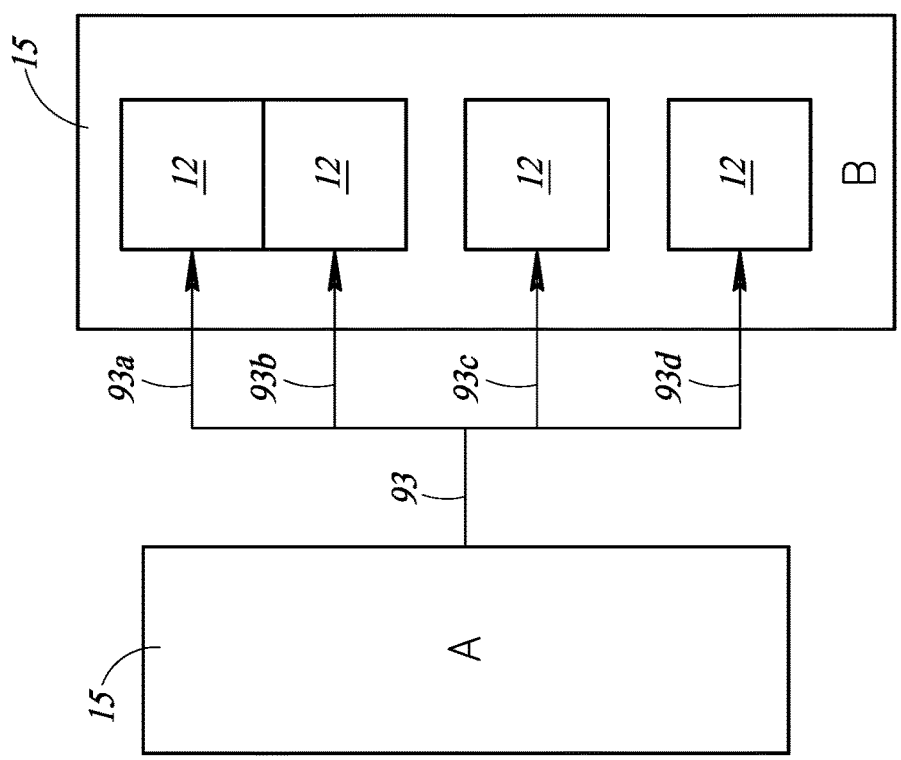

In the multi-fan-out fix step 92, connection fan-outs that were used in the channel-based integrated circuit die 10 are eliminated, as illustrated in FIGS. 8A-8B. FIG. 8A shows a one-to-four fan-out connection between a partition A and a partition B that is typically used in a channel-based design. The one-to-four connection includes an output pin 93 that fans out to multiple input pins 93a, 93b, 93c, 93d, each input pin coupling to a different component 12 in partition B. Pins are ends of a bus when looking at boundaries of a specific partition. When designing the partition, all the designers care about is that they will be receiving or transmitting a signal from another partition, so they note a pin for future coupling to a matching pin from an adjacent partition. Such a connection can be reconfigured in a channel-less design by re-assigning the four-to-one fan-out to four one-to-one connections 95a, 95b, 95c, and 95d, as shown in FIG. 8B. The reconfiguration can be carried out automatically by a computer, by identifying multi-fan-out connections and specifying rules that disallow such connections. This shortens the distance travelled by each signal, which reduces the number of booster or buffer circuits that are needed around the die.

At 94, a process of feed-through insertion is carried out in which preferred routing for the individual interconnection lines between partitions is determined and recorded as a feed-through specification. At this step, connections that would otherwise be routed to the nearest channel along the top surface of the chip are instead routed through a series of partitions 15 to a destination, via metal lines underneath the top surface of the chip. The metal lines in neighboring partitions are actually formed as one metal line in an upper metal level. When looking at the design in software, one pin from one partition is formed to abut a pin from another partition. Desirably, the feed-through specification is developed with input from a top-level physical designer, a chip architect, and a bus designer, to make the best decisions regarding which partitions will be suitable for feed-throughs. Variables to be considered in making feed-through decisions include pin density, floor plan, and the like. The lower metal levels are not adjusted at this point, only the upper metal level layout is considered during this phase of the design. The partition arrangement is basically fixed and the bus design is performed.

Figure 9:
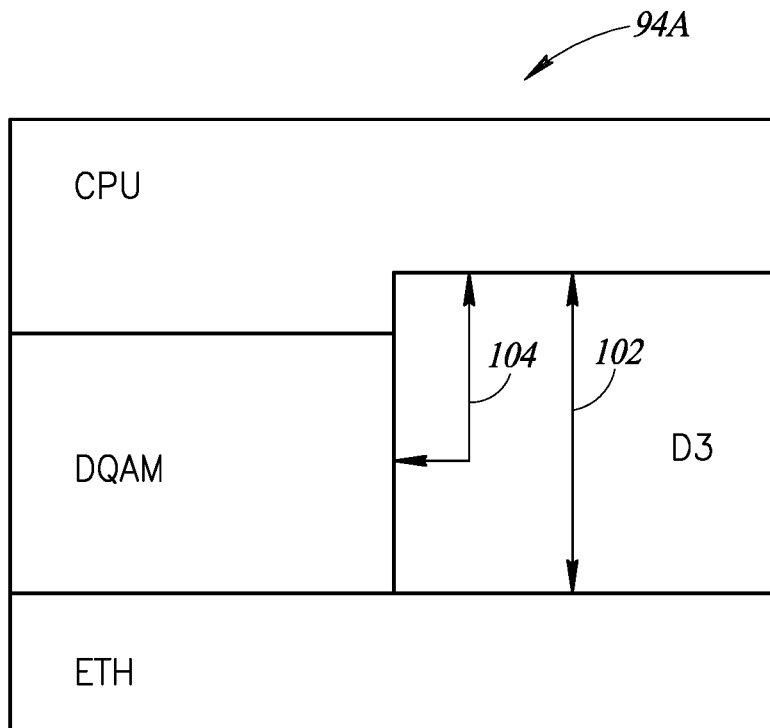
FIGS. 9-10 illustrates a process of feed-through insertion, according to embodiments as described herein.
Figure 10:
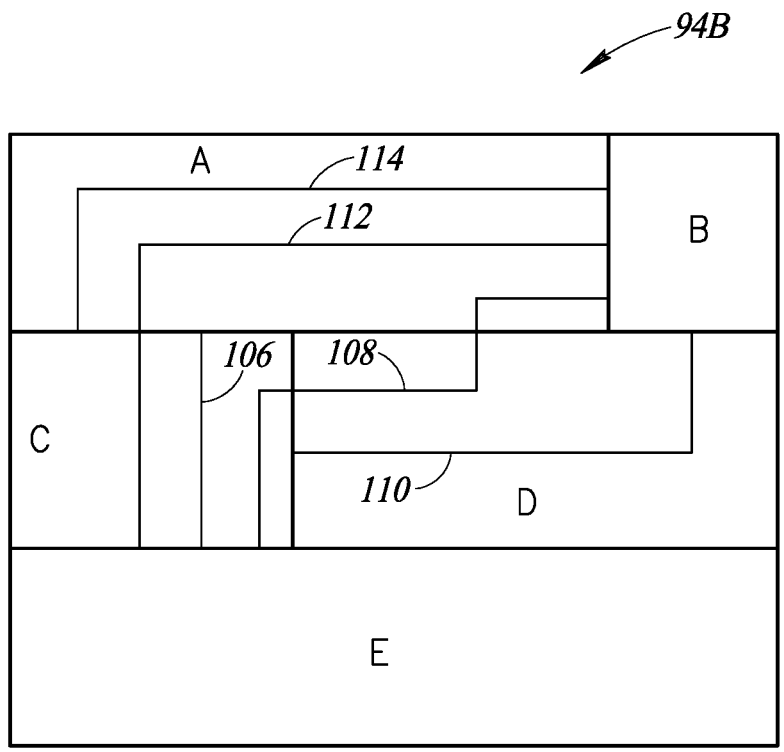

FIGS. 9 and 10 show net topologies 94A and 94B for examples of feed-throughs for non-adjacent partition connections made in step 94 followed by the channel-less floor plan layout. FIG. 9 shows a first exemplary net topology 94A in which two bi-directional feed-throughs 102 and 104 are inserted between four different partitions 15, as follows: a CPU partition, a DQAM partition, a D3 partition, and an ETH partition. A CPU partition is an example of a non-flexible partition that may require connections to be routed around it, while other types of partitions are more flexible in accommodating feed-throughs. The feed-through 102 connects the CPU partition to the ETH partition by traversing partition D3. Feed-through 104 connects the CPU partition to the DQAM partition, also by traversing partition D3. Both of the feed-throughs 102 and 104 provide connection paths in which signals can travel in either direction, indicated by double arrows. These feed-throughs can be specified in a feed-through table such as Table I. A feed-through table is a rule table that facilitates generating feed-throughs automatically by a computer code. The rules are generated by the architect and are programmed into the die design system. The rules may be based on power requirements of each partition or other criteria. It is noted that adjacent partitions do not need feed-throughs. The pins of bus lines located in adjacent partitions are abutted to one another without a feed-through. Table I can be further specified as a list for processing scripts.

TABLE I

A Feed-Through Table Lists Rules for Connecting Partitions Without Using Channels

| From | To | Through |
|------|-----|---------|
| Cpu  | Eth | D3      |
| Dqam | Cpu | D3      |

TABLE I-continued

A Feed-Through Table Lists Rules for Connecting Partitions Without Using Channels

| From | To   | Through |
|------|------|---------|
| D3   | Cpu  | None    |
| D3   | Dqam | None    |
| D3   | Eth  | None    |

FIG. 10 shows a second exemplary net topology 94B in which five feed-throughs 106, 108, 110, 112, and 114 are inserted among five different partitions 15, labeled A, B, C, D, and E. A feed-through code will create paths through each partition to implement rules shown in Table II: The bi-directional feed-through 106 connects partition A to partition E by traversing partition C. The uni-directional feed-through 108 connects partition E to partition B by traversing partitions C, D, and A. The uni-directional feed-through 110 connects partition C to partition B by traversing partition D. The uni-directional feed-through 112 connects partition B to partition E by traversing partitions A and C. The uni-directional feed-through 114 connects partition B to partition C by traversing partition A.

Feed through may travers an intervening partition for which the bus will not transmit or receive data and simply, pass over the circuitry of that partition. For example, the feed through 108 carries a signal to and from partition E and partition B, however, the feed through 108 traverses over circuitry in partition D and partition C. No signal from the feed through 108 is used by the operating circuitry in partitions D or C.

Preferably, the interconnection lines are laid out automatically, according to the various rules encoded in feed-through tables exemplified by Tables I and II. Once the necessary connections are specified, the computer software will perform the feed-through insertion in the channel-less floor plan layout.

TABLE II

A Feed-Through Table Lists Rules for Connecting Partitions Without Using Channels

| From | To | Through |
|------|----|---------|
| A    | E  | C       |
| B    | C  | A       |
| C    | B  | D       |
| B    | E  | A, C    |
| E    | B  | C, D, A |
| A    | B  | None    |
| A    | C  | None    |
| A    | D  | None    |
| B    | D  | None    |
| C    | D  | None    |
| C    | E  | None    |
| D    | E  | None    |

At 96, after the partitions are defined and the interconnections (buses) above and between the partitions are specified, some transistors and circuits in each partition A-E are slightly rearranged to create a channel-less floor plan that includes buffer circuits. The location of the buffer circuits is determined by the bus location, which is not finalized until the feed-through insertion is complete. When circuits within the partitions are rearranged, buffer circuits may also need to be re-arranged. For example, clock buffers that would be located along channels in a conventional design are moved to within partitions in the present channel-less design. Because the partitions 15 are all-inclusive, both clock generators and clock buffer circuits are located within each partition so they can be closer to one another. However, the area within the partition that is needed for the buffer circuits is very small. Namely, each partition A-E will normally have in the range of 4-6 million transistors. A buffer circuit will, on the other hand, have between several dozen and a few hundred transistors. Therefore, following the feed-through insertion step 94, some slight rearranging and movement of some of the circuits in the partitions A-E are made to make room for the contacts and vias and the transistors which make up the buffer circuit.

The location of the buffer circuits is selected to be where it will not cause disruption of the partition A-E that is being used to provide the buffer circuit silicon. For example, a buffer circuit will not be placed in the center of the memory array of any memory, such as an SRAM, DRAM, EPROM, or the like. It can, of course, be placed in the middle of the address buffers where there is frequently excess room. It may also be placed in the peripheral circuitry, adjacent to the redundant or backup circuitry, where there is frequently excess room, and also adjacent to the backup address circuitry or lasers which are below to provide the redundant circuit connections.

In partitions A-E which the conduction buses 16 cross but do not exchange signals or data on that particular connection line buffer circuits are placed at the feed-through insertion locations. Each particular interconnection wire is considered for its length and routing location to determine whether or not buffer circuits or any appropriate amplifiers will be needed. Since the partitions A-E abut each other, in many instances either no interconnection lines are required or very short interconnection lines will be used, thus buffer circuits may be avoided in many instances. However, in partitions that are separated from each other by a distance encompassing most of the chip, at least three and sometimes five buffer circuits will be needed in order to reenergize a signal to ensure that it has sufficient voltage and current when it arrives at the destination partition A-E. Only two metal interconnection wires, namely two pin nets, are created at the upper level metal layers using specific wires for punching through the partitions A-E to obtain access to a small area of silicon in which the custom buffer circuit will be built that is segmented from the rest of that partition. Namely, each partition A-E will have a very small area, such as a few hundred square nanometers which are set aside for use in the buffer circuits that will be used to amplify and resend the signal on any of the paths 16 that cross through that partition A-E but which do not exchange signal or data with that partition.

Buffer usage is determined according to which connection lines need buffers and where the buffers are generally to be located. The specification for each of the partitions is slightly eased in order to permit the appropriate buffer circuit to be placed in the silicon. Verification of the feed-through specification then occurs. The nets can transfer as multiple partitions. For example, as shown in FIG. 4, the network of interconnection lines that connects partitions can extend from partition 6 to partition 1 and pass through partition 4. Similarly, signals can travel in the reverse direction from partition 1 to partition 6 and have the buffer circuits in partition 4.

At 98, after the locations for the interconnections and the locations for the buffer circuits as needed are determined, then the channel-less floor plan design is laid out to complete the fully abutted top design. The partitions 1-6 are then selectively placed in the integrated circuit die 40 in a final pattern as shown in FIG. 4 to be fully abutted at boundaries. Namely, partitions that will be connected at any of the upper metal are closely adjacent to each other to avoid the use of unnecessary interconnection lines. The channel-less floor plan will make use of two or more upper metal layers that act as a net to carry the interconnections that form the buses 16 to connect the partitions 1-6 to each other. Individual buses 16 are separated as much as is practical. Accordingly, the channel-less floor plan layout is completed.

Finally, the step 78 of organizing partitions 15 into partition units, the P&R step 82, and the static timing analysis step 86 are carried out towards design of the full chip as previously explained with respect to the prior art. During the STA process 86, precise design rule checking (DRC) and verification can be done using computer-aided design (CAD) tools to ensure that the channel-less design is compliant with the rules it is intended to implement. In addition, fixed I/O conditions can be defined on partition ports that translate to real physical constraints.

Figure 11:
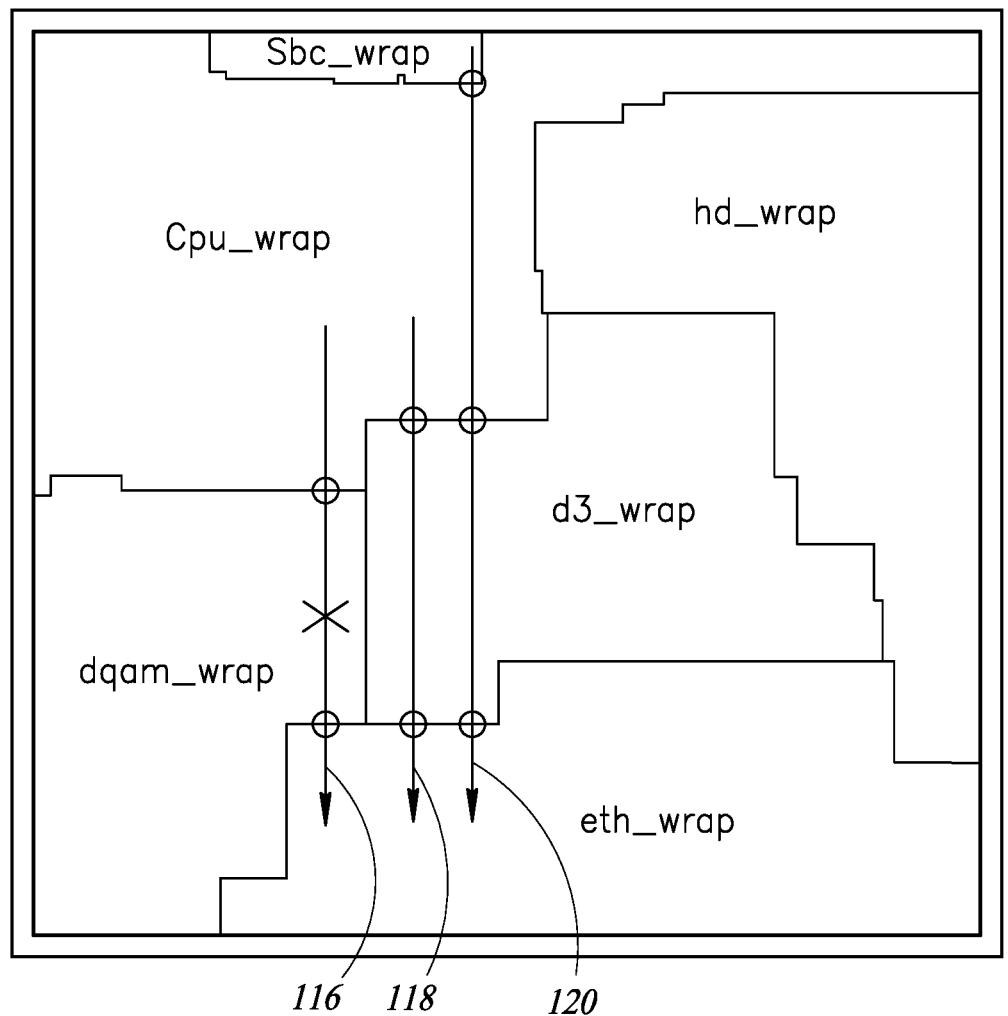
FIG. 11 illustrates a violation of a feed-through insertion rule as detected during an automated verification process.

FIG. 11 illustrates an exemplary violation of the feed-through rules that is detected during an automated checking procedure. FIG. 11 shows a chip having partitions arranged as shown in FIG. 4, as an example. An interconnection 116 is routed from the CPU partition to the ETH partition through the DQAM partition. The interconnection 116 violates a feed-through rule, as indicated by an "X". Two alternative routing options exist as shown: a first connection 118 that passes through D3 instead of DQAM, and a second connection 120 that passes from a SBC partition through the CPU and D32 partitions, to the ETH partition.

Figure 12:
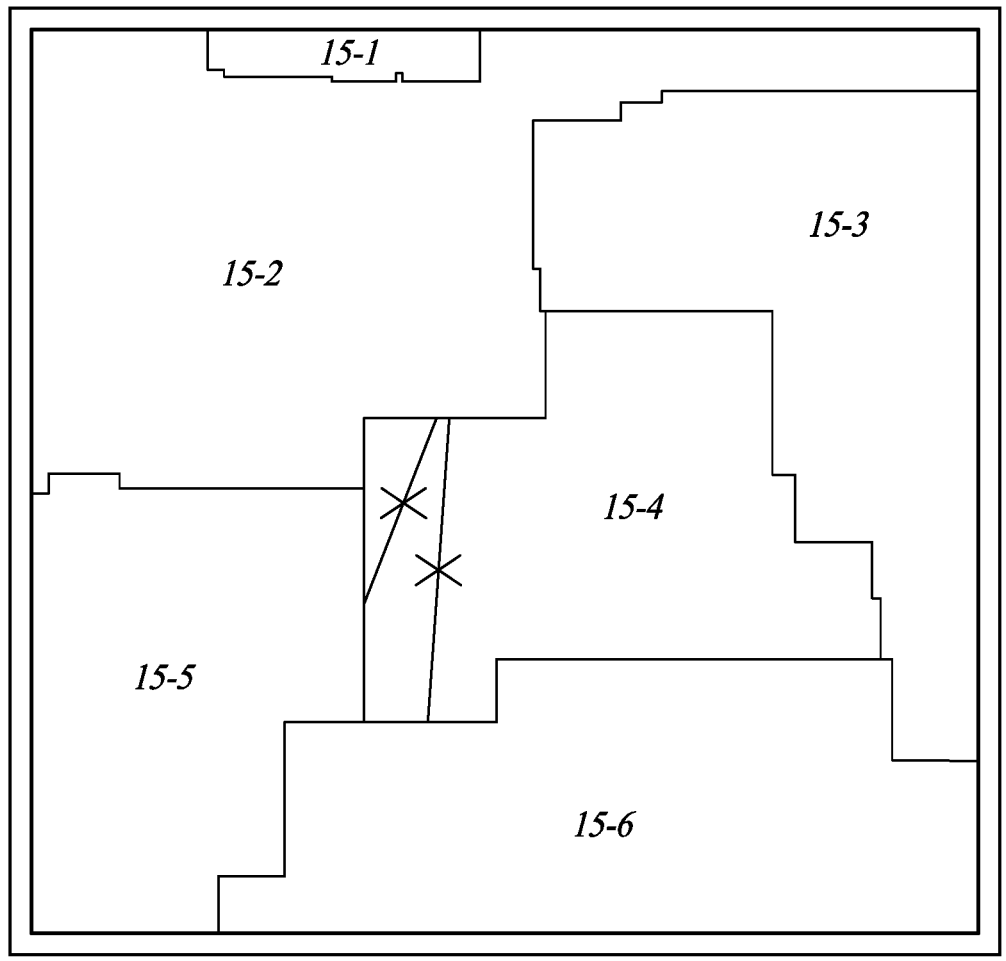
FIG. 12 illustrates a violation of a multi-fan-out rule as detected during an automated verification process.

FIG. 12 illustrates an exemplary violation of the multi-fan-out rule that has been detected using an automated verification tool. The violation is identified as being located in partition D3 and is flagged for correction. In particular, a connection line originating in partition 15-2 is shown as fanning out to two connection pins, one connecting to partition 15-5 and the other connecting to partition 15-6. The 1:2 fan-out is flagged as indicated by the X's located in the intervening partition 15-4. The violation can then be corrected by repeating the multi-fan-out fix process at step 92 in which two one-to-one connections are specified to replace the 1:2 fan-out.

Figure 13:
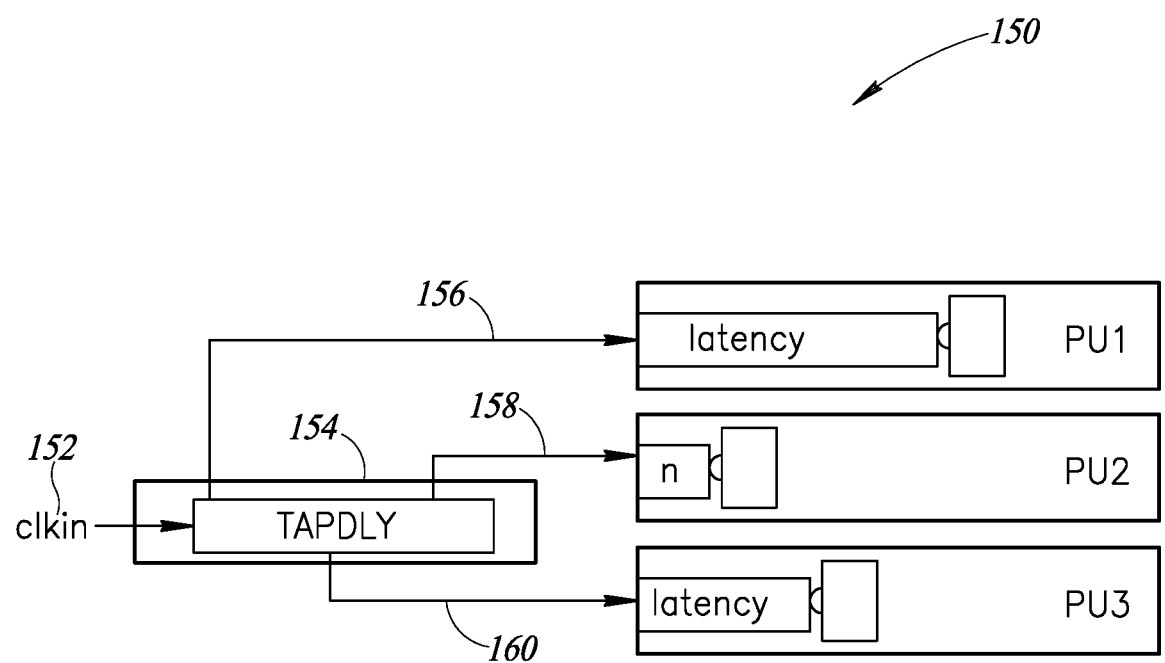
FIG. 13 illustrates an automated process of clock balancing according to embodiments of the present disclosure.

One of the differences between the methods 70 and 90 is that clock balancing is handled differently. An exemplary clock-balancing scheme 150 for use in the method 90 is shown in FIG. 13. The clock-balancing scheme 150 ensures that timing is correct between partitions by introducing delays between clock buffers placed along a connection path between partitions. The clock buffers may, for example, be spaced apart by 100-micron intervals along a conventional channel. However, because the partitions 15 are much closer to each other and the individual bus lines are in different locations in the present channel-less design, less clock balancing is required. Consequently, clock buffers may only need to be placed every 200 microns along a fully abutted interconnect line.

With reference to FIG. 13, a synchronous clock signal 152 is provided to multiple partition units PU1, PU2, and PU3 using a channel-less clock-balancing scheme 150. A tap delay 154 is then applied to the clock signal 152 to create branches, or independent clock signals 156, 158, and 160 that can be pushed separately to each partition unit. A balancing architecture is provided to determine the correct tap delays. If there are circuits within the partition unit that need particular timing, appropriate latency circuits are provided for the clock to ensure proper clock timing in each of the partitions. Of course, the individual design teams for each partition unit will try to achieve a minimum clock insertion delay. When the partition clocks have been tested and are stable, tap delays at the root of the clock are adjusted to balance the various segments within each partition unit. Tap delays can be adjusted by issuing engineering change orders (ECOs) to the design as needed.

One feature that is permitted according to the designs explained herein is that the tap delay provides a required range to delay or de-skew different levels of the clock with a minimum area and variability. Any delays in the clock or tap delays in the clock connections should be transparent to the individual partition units and should provide quick verification. One possible solution is to use the clock delay circuit with a basic cell that is a chain of delay buffers with a fixed load. This can be used to balance the clock or the clock latency within the partition or between partitions as needed. Further, a cell is provided which contains a tap delay inside with multiple tap delay instances. If a user in a particular partition needs clocks having different delays, the individual taps of the cell can be accessed to get a clock with the appropriate timing and phase delay. Each tap delay provides one clock input and multiple clock outputs that are controlled by the overall clock of the integrated circuit. The clock balancing circuit only affects wiring changes inside a particular partition. This permits the isolation of clock changes for balancing from one partition to another and permits the delay cell to be contained only within a particular partition itself. This makes the design turnaround time for clock balancing very quick.

The present disclosure is directed to a device that includes a semiconductor substrate, a plurality of integrated circuit components having transistors formed in the semiconductor substrate, each one of the components occupying a selected region of a total chip area on a surface of the semiconductor substrate. The device includes a plurality of interconnection lines providing connectivity among the plurality of integrated circuit components, the interconnection lines being contained substantially within one or more top layers of metallization of respective integrated circuit components and abutting one another, such that no substantial portion of the total chip surface area is dedicated to the interconnection lines. The device also includes a plurality of interconnection vias and contacts that couple the integrated circuit components to the interconnection lines.

The device can be a system-on-chip. The integrated circuit components include one or more of a microprocessor, a graphics processor, a digital signal processor, a memory array, a bus bridge, or a peripheral logic block. The device also includes a plurality of buffer circuits coupled to the interconnection lines, each buffer circuit taking as an input a low strength signal having a data value that is transmitted from a first integrated circuit component to a second integrated circuit component, the buffer circuit outputting a high strength signal having substantially the same data value, the buffer circuit being located within one of the selected regions. The device can also include a plurality of clock buffer circuits coupled to the interconnection lines, each clock buffer circuit taking as an input a digital clock signal having an input voltage level, and outputting a delayed clock signal having an output voltage level substantially equal to the input voltage level, the clock buffer circuit being located within one of the selected regions.

The present disclosure is also directed to a system that includes a microprocessor and a non-transitory computer-readable memory communicatively coupled to the microprocessor, the memory having instructions stored thereon that cause the microprocessor to partition, according to a set of partitioning rules, an integrated circuit chip into a plurality of design unit partitions and re-configure, according to a set of interconnect design rules, a channeled interconnect layer disposed between partitions, to form a fully abutted interconnect layer contained within the partitions.

In another embodiment, a computer-implemented method includes partitioning, by a processor-based automated system, an integrated circuit chip into a plurality of design unit partitions according to a set of pre-defined partitioning rules and re-configuring, by the processor-based automated system, a channeled interconnect layer, disposed between partitions, to form a fully abutted interconnect layer contained within the partitions. The method also includes re-routing, by the processor-based automated system, a plurality of channeled interconnect lines of the integrated circuit chip through adjacent partitions and re-routing, by the processor-based automated system, a plurality of channeled multi-fan-out interconnect lines of the integrated circuit chip. The method can include allocating a clock buffer region on a top level of the integrated circuit chip, the clock buffer region being adjacent to a clock source within a partition and defining input/output conditions at one or more input/output ports of the partition. Also, the method includes determining a number of clock delays to be applied to clock signals for different components of the integrated circuit chip and inserting clock buffers in the clock buffer region to provide the determined number of clock delays for the fully abutted interconnect layer.

In another embodiment, a computer-implemented method of designing integrated circuits includes selecting a plurality of design units representing microelectronic components, assigning design units to partitions, re-structuring the partitions to reduce a number of bus lines connecting partitions to one another, eliminating multi-fan-out connections, routing connections among the partitions, the connections abutting one another at partition boundaries, generating a floor plan that includes a network of fully abutted interconnections, laying out a plurality of partition units according to the floor plan, performing a position-and-rotate process, performing a system timing analysis, and carrying out a clock balancing procedure, based on the system timing analysis, the clock balancing procedure inserting clock buffers into partitions based on a topology of the network of fully abutted interconnections.

The method can include eliminating multi-fan-out connections replaces fan-out connections with one-to-one connections and the clock balancing procedure entails inserting tap delays. The partitions include clock generators and clock buffers. The feed-through process is carried out automatically according to a specification encoded in a rule table.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
    forming a channel-less integrated semiconductor die by:
        forming a first plurality of conductive levels on a substrate;
        forming first, second, and third plurality of interconnections from the first plurality of conductive levels;
        forming first, second, and third logical circuits in the substrate, the first, second, and third logical circuits including the first, second, and third plurality of interconnections, respectively;
        forming a second plurality of conductive levels on the first plurality of conductive levels;
        forming a first bus in at least one of the second plurality of conductive levels, the first bus electrically coupling the first logical circuit to the second logical circuit, the first bus extending across the third logical circuit; and
        forming a buffer circuit in the substrate, the buffer circuit being electrically coupled to the first bus, the first logical circuit being spaced from the second logical circuit by the buffer circuit.

2. The method of claim 1 wherein forming the first bus includes electrically coupling a first portion of the first bus to the buffer circuit and a second portion of the first bus to the buffer circuit.

3. The method of claim 2 wherein forming the buffer circuit includes forming the buffer circuit to amplify a signal from the first portion to the second portion of the first bus.

4. The method of claim 2 wherein forming the buffer circuit includes forming the buffer circuit in the third logical circuit.

5. The method of claim 1 wherein forming the first, second, and third plurality of interconnections includes electrically isolating the first, second, and third plurality of interconnections from each other.

6. The method of claim 1 wherein the forming of the channel-less integrated semiconductor die includes forming a second bus in at least one of the second plurality of conductive levels, the second bus electrically coupling the first logical circuit to the third logical circuit.

7. A method, comprising:
    forming a channel-less integrated semiconductor die having a plurality of areas, each of the plurality of areas having a boundary that directly abuts a boundary of another area of the plurality of areas, the forming of the channel-less integrated semiconductor die including:
        forming a first group of metal levels on a substrate;
        forming a plurality of internal interconnection lines from the first group of metal levels;
        forming a second group of metal levels on the first group of metal levels;
        forming a plurality of logical units, each of the plurality of logical units being within boundaries of one of the plurality of areas;
        forming a plurality of interconnection buses from the second group of metal levels;
        forming each of the plurality of interconnection buses to transmit a data signal from a first one of the plurality of logical units to a second one of the plurality logical units, a first interconnection bus of the plurality of interconnection buses extending across a third one and a fourth one of the plurality of logical units; and
        forming a plurality of buffer circuits by coupling a first one and a second one of the plurality of buffer circuits to the first interconnection bus, the first one of the plurality of buffer circuits being within the same boundaries as the third one of the plurality of logical units, the second one of the plurality of buffer circuits being within the same boundaries as the fourth one of the logical units.

8. The method of claim 7 wherein forming the plurality of interconnection buses includes spacing the first one of the plurality of logical units from the second one of the plurality of logical units by the third one and the fourth one of the plurality of logical units.

9. The method of claim 8 wherein each of the plurality of interconnection lines is within boundaries of the respective logical unit.

10. A method, comprising:
    forming a channel-less integrated semiconductor die by:
        forming a first plurality of metal levels on a substrate;
        forming a first plurality of interconnection lines from the first plurality of metal levels;
        forming a second plurality of interconnection lines from the first plurality of metal levels;
        forming a first logical unit having a plurality of transistors and passive circuitry components within a first area of the substrate, the first logical unit including the first plurality of interconnection lines;
        forming a second logical unit having a plurality of transistors and passive circuitry components within a second area of the substrate, the second logical unit including the second plurality of interconnection lines;
        forming a third logical unit having a plurality of transistors and passive circuitry components within a third area of the substrate;
        forming a second plurality of metal levels on the first plurality of metal levels;
        forming a first bus in a metal level of the second plurality of metal levels, the first bus extending from the first logical unit, across the third logical unit, and to the second logical unit; and
        forming a buffer circuit in the substrate, the buffer circuit being electrically coupled to the first bus.

11. The method of claim 10 wherein forming the first bus includes electrically coupling the first bus to the first plurality of interconnection lines and the second plurality of interconnection lines.

12. The method of claim 11 wherein forming the channel-less integrated semiconductor die includes forming a third plurality of interconnection lines from the first plurality of metal levels, the third logical unit including the third plurality of interconnection lines.

13. The method of claim 12 wherein forming the first bus includes electrically isolating the first bus from the third plurality of interconnection lines.

14. The method of claim 12 wherein the first bus passes over the third plurality of interconnections lines and the third area.

15. The method of claim 10 wherein the first, second, and third areas having non-overlapping boundaries.

16. The method of claim 10 wherein forming the channel-less integrated semiconductor die includes electrically isolating the first plurality of interconnection lines from the second plurality of interconnection lines.

* * * * *